United States Patent
Wakabayashi

(10) Patent No.: US 7,772,332 B2
(45) Date of Patent: Aug. 10, 2010

(54) CURABLE COMPOSITION

(75) Inventor: Katsuyu Wakabayashi, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 12/297,783

(22) PCT Filed: Apr. 19, 2007

(86) PCT No.: PCT/JP2007/058490

§ 371 (c)(1),
(2), (4) Date: Oct. 20, 2008

(87) PCT Pub. No.: WO07/123167

PCT Pub. Date: Nov. 1, 2002

(65) Prior Publication Data

US 2009/0069505 A1    Mar. 12, 2009

(30) Foreign Application Priority Data

Apr. 20, 2006    (JP) .............................. 2006-116301

(51) Int. Cl.
C08G 77/14    (2006.01)
C08G 77/16    (2006.01)
C08G 77/24    (2006.01)

(52) U.S. Cl. ........................... 525/474; 525/25; 525/26; 525/478

(58) Field of Classification Search ................. 525/474
See application file for complete search history.

(56) References Cited

U.S. PATENT DOCUMENTS

| | | | |
|---|---|---|---|
| 2,436,777 A * | 2/1948 | Pietcher et al. ............. | 556/477 |
| 4,381,377 A * | 4/1983 | Kampf et al. ............... | 525/375 |
| 4,904,732 A | 2/1990 | Iwahara et al. | |
| 5,605,997 A | 2/1997 | Yamamoto et al. | |
| 5,633,311 A * | 5/1997 | Yamamoto et al. ........... | 528/14 |
| 6,777,485 B1 * | 8/2004 | Ito et al. ..................... | 524/588 |
| 6,875,880 B2 * | 4/2005 | Nishiwaki et al. ........... | 556/440 |
| 2007/0265409 A1 | 11/2007 | Wakabayashi et al. | |

FOREIGN PATENT DOCUMENTS

| | | |
|---|---|---|
| CA | 2 081 242 A1 | 4/1993 |
| EP | 0 538 881 A2 | 4/1993 |
| EP | 0 705 866 A1 | 4/1996 |
| EP | 1 930 375 A1 | 6/2008 |
| JP | 32-003742 B | 2/1954 |
| JP | 52-073998 A | 6/1977 |
| JP | 63-006041 A | 1/1988 |
| JP | 05-117519 A | 5/1993 |
| JP | 08-104753 A | 4/1996 |
| WO | 2006/051799 A1 | 5/2006 |
| WO | 2007/040124 A1 | 4/2007 |

* cited by examiner

*Primary Examiner*—Randy Gulakowski
*Assistant Examiner*—Mike Dollinger
(74) *Attorney, Agent, or Firm*—Sughrue Mion, PLLC

(57) ABSTRACT

An object is to provide a curable composition having a good curability by use of an organotin-free catalyst, and the object is solved by a curable composition, comprising: (A) a polymer having a silicon group which can be crosslinked through formation of a siloxane bond, (B) fluorosilanes represented by general formula (1): $R^1{}_{4-a}SiF_a$ (1) (wherein $R^1$'s, the number of which is 4-a, are each independently a substituted or unsubstituted hydrocarbon group having 1 to 20 carbon atoms, or at least one selected from the group consisting of siloxy groups represented by $R^2{}_3SiO—$ (wherein $R^2$'s are each independently a substituted or unsubstituted hydrocarbon group having 1 to 20 carbon atoms or a fluorine atom), and a is any of 1, 2 or 3), and (C) an amine based compound.

6 Claims, No Drawings

CURABLE COMPOSITION

TECHNICAL FIELD

The present invention relates to a curable composition containing a polymer which has a hydroxyl group or a hydrolyzable group bonded to a silicon atom and has a silicon group that can be crosslinked through formation of a siloxane bond (also referred to as a "reactive silicon group" hereinafter).

BACKGROUND ART

It is known that a polymer having at least one reactive silicon group in its molecule has a nature that the polymer is crosslinked through formation of siloxane bonds, which follows hydrolysis reaction or the like of the reactive silicon group due to moisture or the like, even at room temperature, so as to give a rubbery cured product.

Out of such polymers having a reactive silicon group, organic polymers having a main chain skeleton made of polyoxyalkylene based polymer or polyisobutylene based polymer are disclosed in JP-A-52-73998, JP-A-63-6041 and the like, and have already been industrially produced and have widely been used for sealants, adhesives, paints and the like. Curable compositions containing a polymer having a main chain skeleton made of polysiloxane, in particular, diorganopolysiloxane have also been reported in many documents such as JP-B-32-3742.

Curable compositions used for sealants, adhesives, paints and the like, and rubbery cured products obtained by curing the compositions are required to have various properties such as curability, adhesiveness, and mechanical properties.

Curable compositions containing a polymer having a reactive silicon group are cured by use of a curable catalyst. Usually, an organotin catalyst having a carbon-tin bond, such as dibutyltin bis(acetylacetonate) has widely been used. In recent years, however, about organotin compounds, the toxicity thereof has been pointed out. Thus, organotin-free catalysts have been desired to be developed.

Many researches have been made on metal carboxylates, metal alkoxides, and the like as organotin-free catalysts. Among them, carboxylic acids or amine compounds are catalysts containing no metal, and are expected to give only relatively small effects onto the environment. Patent Document 4 discloses that use of a combination of a carboxylic acid with an amine gives a curable composition having a good curability. However, in curable compositions which are cured by a silanol catalyst in which an amine compound and a carboxylic acid are used in combination, the resultant cured products cannot easily gain a sufficient adhesiveness. Thus, some of the compositions are unsuitable for sealants, adhesives and the like. As stated in JP-A-05-117519, sufficient curability is not easily obtained by use of an amine compound alone.

On the other hand, as a catalyst for producing an organopolysiloxane by hydrolyze/condensing an alkoxysilane, a compound having a Si—F bond is disclosed in JP-A-08-104753. However, this compound alone exhibits very low reactivity as a curing catalyst for a polymer having a reactive silicon group.

DISCLOSURE OF THE INVENTION

Problems to be Solved by the Invention

An object of the present invention is to provide a curable composition which is made mainly of a polymer having a reactive silicon group and has a good curability by use of an organotin-free catalyst.

Means for Solving the Problems

In order to solve such problems, the inventors have made eager investigations so as to complete the following inventions.

That is, the present intention relates to:

(I). A curable composition, comprising:

(A) a polymer having a silicon group which can be crosslinked through formation of a siloxane bond, (B) fluorosilanes represented by general formula (1):

$$R^1_{4-a}SiF_a \qquad (1)$$

(wherein $R^1$'s, the number of which is 4-a, are each independently a substituted or unsubstituted hydrocarbon group having 1 to 20 carbon atoms, or at least one selected from the group consisting of siloxy groups represented by $R^2_3SiO$— (wherein $R^2$'s are each independently a substituted or unsubstituted hydrocarbon group having 1 to 20 carbon atoms or a fluorine atom), and a is any of 1, 2 or 3), and (C) an amine based compound, (II). the curable composition according to (I), wherein the component (A) is a polymer having a number-average molecular weight of 3,000 to 100,000, and has one or more silicon group(s) represented by general formula (2):

$$-(SiR^4_{2-c}Z_cO)_1-SiR^3_{3-b}Z_b \qquad (2)$$

(wherein $R^3$ and $R^4$ are each independently a hydrocarbon group having 1 to 20 carbon atoms, or at least one selected from the group consisting of triorganosiloxy groups represented by $R^5_3SiO$— (wherein $R^5$'s are each independently a hydrocarbon group having 1 to 20 carbon atoms); Z's are each independently a hydroxyl group or a hydrolyzable group; b is any of 0, 1, 2 or 3 and c is any of 0, 1 or 2, provided that a case where b and c are each 0 is excluded, and 1 is an integer of 0, or 1 to 19) on average per molecule of the component (A), (III). the curable composition according to (I) or (II), wherein a main chain skeleton of the polymer of the component (A) is at least one selected from the group consisting of a polyoxyalkylene based polymer, a saturated hydrocarbon based polymer, and a (meth)acrylate based polymer, (IV). the curable composition according to (II) or (III), wherein Z is an alkoxy group, (V). the curable composition according to (IV), wherein the alkoxy group is a methoxy group, (VI). the curable composition according to any one of (I) to (V), wherein the component (B) is fluorosilanes having a molecular weight of 3,000 or less, (VII). a sealant comprising a curable composition according to any one of (I) to (VI), and (VIII). an adhesive comprising a curable composition according to any one of (I) to (VI).

EFFECT OF THE INVENTION

The curable composition of the present invention has a good curability while using an organotin-free catalyst.

BEST MODE FOR CARRYING OUT THE INVENTION

The present invention will be described in detail hereinafter.

The curable composition of the present invention contains a polymer, that is a component (A) as an essential component, having one or more reactive silicon groups on average per molecule, wherein the reactive silicon group can be crosslinked through formation of a siloxane bond. Here, the reactive silicon group is a silicon group having a hydroxyl group or a hydrolyzable group bonded to a silicon atom. A polymer having a reactive silicon group has a characteristic that siloxane bonds are formed by a reaction accelerated by a silanol condensation catalyst, so that crosslinking is caused.

The reactive silicon group includes a group represented by general formula (2):

$$-(SiR^4{}_{2-c}Z_cO)_1-SiR^3{}_{3-b}Z_b \qquad (2)$$

(wherein $R^3$ and $R^4$ are each independently a hydrocarbon group having 1 to 20 carbon atoms, or at least one selected from the group consisting of triorganosiloxy groups represented by $R^5{}_3SiO-$, (wherein $R^5$'s are each independently a hydrocarbon group having 1 to 20 carbon atoms); Z's are each independently a hydroxyl group or a hydrolyzable group; b is any of 0, 1, 2 or 3, and c is any of 0, 1 or 2, provided that a case where b and c are each 0 is excluded, and 1 is an integer of 0, or 1 to 19).

The main chain skeleton of the component (A) is not particularly limited to. Thus, polymers having various main chain skeletons can be used.

Specific examples thereof include polyoxyalkylene polymers such as polyoxyethylene, polyoxypropylene, polyoxybutylene, polyoxytetramethylene, polyoxyethylene-polyoxypropylene copolymer, polyoxypropylene-polyoxybutylene copolymer and the like; hydrocarbon polymers such as ethylene-propylene based copolymer, polyisobutylene, copolymer made from isobutylene and isoprene or the like, polychloroprene, polyisoprene, copolymer made from isoprene or butadiene, and acrylonitrile and/or styrene or the like, polybutadiene, copolymer made from isoprene or butadiene, and acrylonitrile and styrene or the like, hydrogenated polyolefin polymers obtained by hydrogenating these polyolefin polymers, and other hydrocarbon polymers; polyester polymers each obtained by condensing between a dibasic acid such as adipic acid and glycol, or by ring-opening-polymerizing a lactone; (meth)acrylate polymers each obtained by radical-polymerizing ethyl (meth)acrylate, butyl (meth)acrylate, or some other monomer; vinyl polymers each obtained by radical-polymerizing a (meth)acrylate monomer, vinyl acetate, acrylonitrile, styrene or some other monomer; graft polymers each obtained by polymerizing the vinyl monomer in any one of the above-mentioned polymers; polysulfide polymers; polyamide 6 obtained by ring-opening-polymerizing ε-caprolactam, polyamide 6,6 obtained by polycondensing hexamethylenediamine and adipic acid, polyamide 6,10 obtained by polycondensing hexamethylenediamine and sebacic acid, polyamide 11 obtained by polycondensing ε-aminoundecanoic acid, polyamide 12 obtained by ring-opening-polymerizing ε-aminolaurolactam, copolymer polyamides each having two or more components out of the above-mentioned polyamides, and other polyamide polymers; a polycarbonate polymer produced by polycondensing bisphenol A and carbonyl chloride; diallyl phthalate polymers; and other organic polymers. Polysiloxane based polymers such as polydiorganosiloxane can also be used. More preferred are saturated hydrocarbon polymers such as polyisobutylene, hydrogenated polyisoprene and hydrogenated polybutadiene, the polyoxyalkylene based polymers, the (meth)acrylate polymers, and the polysiloxane based polymers since they have a relatively low glass transition temperature and give a cured product excellent in cold resistance.

The glass transition temperature of the polymer(s) of the component (A) is not particularly limited to, and is preferably 20° C. or lower, more preferably 0° C. or lower, in particular preferably −20° C. or lower. If the glass transition temperature is higher than 20° C., the viscosity becomes high in winter or in cold districts so that the workability may deteriorate. Moreover, the flexibility of the cured product to be obtained falls so that the elongation may lower. The glass transition temperature can be obtained by DSC measurement.

In the case of using, as a base polymer of an adhesive or a sealant, a polymer having a main chain skeleton made of a saturated hydrocarbon based polymer, a polyoxyalkylene based polymer, a (meth)acrylate polymer, and the like, pollution based on the bleeding of the low molecular weight components into an adherend, or the like is less generated, and thus it is preferred.

A polymer having a main chain skeleton made of a polyoxyalkylene based polymer and a (meth)acrylate polymer is particularly preferred since the polymer is high in moisture permeability, the polymer is excellent in depth curability when the polymer is used as a base polymer of a one-part-type adhesive, a sealant or the like, and the resultant cured product is excellent in adhesiveness and the like. The most preferred is a polymer having a main chain skeleton made of a polyoxyalkylene based polymer.

The hydrolyzable group represented by Z in general formula (2) is not particularly limited to, and may be a hydrolyzable group known in the prior art. Specific examples thereof include a hydrogen atom, halogen atoms, and alkoxy, acyloxy, ketoximate, amino, amide, acid amide, aminooxy, mercapto, alkenyloxy groups and the like. Among them, a hydrogen atom, and alkoxy, acyloxy, ketoximate, amino, amide, aminooxy, mercapto and alkenyloxy groups are preferred. The alkoxy groups are particularly preferred since the groups have mild hydrolyzability and good handleability.

One to three hydrolyzable groups or hydroxyl groups which are each the same as described above can be bonded onto the single silicon atom. The value of (b+Σc) which shows the total number of hydrolyzable groups and hydroxyl groups contained in a molecule of a polymer is preferably from 1 to 5. When the hydrolyzable groups or hydroxyl groups the number of which is two or more are bonded into the reactive silicon group, they may be the same or different.

In particular, a reactive silicon group represented by the following general formula (3) is preferred since the group is easily available:

$$-SiR^3{}_{3-d}Z_d \qquad (3)$$

(wherein $R^3$ and Z have the same meanings used in general formula (2), and d is 1, 2, or 3).

Specific examples of $R^3$ described in general formula (2) and (3), and $R^4$ described in general formula (2) are not particularly limited to, and include alkyl groups such as a methyl, ethyl group and the like; cycloalkyl groups such as a cyclohexyl group and the like; aryl groups such as a phenyl group and the like; aralkyl groups such as a benzyl group and the like; and triorganosiloxy groups represented by $(R^5)_3SiO$— wherein $R^5$s are each a methyl, phenyl group, or the like; and the like. Among them, a methyl group is particularly preferred.

More specific examples of the reactive silicon group include trimethoxysilyl group, triethoxysilyl group, triisopropoxysilyl group, dimethoxymethylsilyl group, diethoxymethylsilyl group, diisopropoxymethylsilyl group, methoxydimethylsilyl group and ethoxydimethylsilyl group. Among them, preferred are the trimethoxysilyl, triethoxysilyl and dimethoxymethylsilyl group, and more preferred is the trimethoxysilyl group since they have a high activity to give a good curability. From the viewpoint of storage stability of a curable composition, the dimethoxymethylsilyl group is particularly preferred. The triethoxysilyl group is particularly preferred since an alcohol generated in company with the hydrolysis reaction of the reactive silicon group is ethanol so that a higher safety is exhibited.

A curable composition containing, as a main component, polymers having a reactive silicon group having three hydrolyzable groups on a silicon atom is preferred since it tends to give a good curability and further supplies a cured product having good recovery property, durability, and creep resistance.

The method for introducing a reactive silicon group is not particularly limited to, and a known method may be used. Specifically, the following methods can be exemplified:

Method (A) A polymer having in the molecule thereof a functional group such as a hydroxyl group is caused to react with an organic compound having an active group reactive with this functional group and an unsaturated group or an unsaturated-group-containing epoxy compound to yield a polymer having the unsaturated group, thereby yielding an unsaturated-group-containing polymer. Next, the resultant reaction product is caused to act on a hydrosilane having a reactive silicon group, thereby hydrosililating the product;

Method (B) An unsaturated-group-containing polymer obtained in the same manner as in the method (A) is caused to react with a compound having a mercapto group and a reactive silicon group;

Method (C) A polymer having in the molecule thereof a functional group such as a hydroxyl group, epoxy group and isocyanate group is caused to react with a compound having a functional group reactive with this functional group and a reactive silicon group; and the like can be exemplified.

Out of the above-mentioned methods, the method (A) and the method of causing a polymer having a hydroxyl group at its terminal to react with a compound having an isocyanate group and a reactive silicon group among variations of the method (C) are preferred since a high conversion ratio can be obtained in a relatively short reaction time. Moreover, the method (A) is particularly preferred since the reactive-silicon-group-containing polymer obtained by the method (A) becomes a curable composition having a lower viscosity and a better workability than the polymer obtained by the method (C) and the polymer obtained by the method (B) generates a strong odor based on mercaptosilane.

Specific examples of the hydrosilane used in the method (A) include halogenated silanes such as trichlorosilane, dichloromethylsilane, chlorodimethylsilane, dichlorophenylsilane and the like; alkoxysilanes such as trimethoxysilane, triethoxysilane, dimethoxymethylsilane, diethoxymethylsilane, dimethoxyphenylsilane, ethyldimethoxysilane, methoxydimethylsilane ethoxydimethylsilane and the like; acyloxysilanes such as diacetoxymethylsilane, diacetoxyphenylsilane and the like; and ketoximatesilane such as bis(dimethylketoximate)methylsilane, bis(cyclohexylketoximate)methylsilane and the like; and the like. However, the hydrosilane is not limited thereto. Among them, halogenated silanes, and alkoxysialnes are preferred, and alkoxysialnes are most preferred since they give a curable composition having a mild hydrolyzability and good handleability. Out of the alkoxysilanes, methyldimethoxysilane is particularly preferred since it is easily available and a curable composition containing, as a main component, the polymer (A) to be obtained and a cured product have good characteristics such as high curability, storage stability, elongation property, tensile strength and the like.

Out of the above-mentioned hydrosilanes, a hydrosilane represented by the following general formula (4) is preferred since a curable composition containing, as a main component, the polymer obtained by addition reaction of the hydrosilane compound has very good curability:

$$H-SiZ_3 \quad (4)$$

(wherein Z has the same meaning described in the general formula (2)). Out of hydrosilane compounds represented by the general formula (4), more preferred are trialkoxysilanes such as trimethoxysilane, triethoxysilane, triisopropoxysilane and the like.

Out of the trialkoxysialnes, a trialkoxysilane having an alkoxy group having one carbon atom (a methoxy group), such as trimethoxysilane and the like, may cause speedy advance of disproportionation reaction. When the disproportionation reaction advances, compounds having a very high reactivity, such as dimethoxysilane, may be generated.

Therefore, from the viewpoint of safe handling, it is preferred to use a trialkoxysilane having an alkoxy group having 2 or more carbon atoms and represented by the following general formula (5):

$$H-Si(OR^6)_3 \quad (5)$$

(wherein $R^6$s, the number of which is three, are each independently an organic group having 2 to 20 carbon atoms). Among them, triethoxysilane is most preferred since they are easily available and safety thereof is high when handling.

The synthesis method (B) may be, for example, a method of introducing a compound having a mercapto group and a reactive silicon group into an unsaturated bond moiety of the polymer by radical addition reaction in the presence of a radical initiator and/or a radical-generating source. However, the method (B) is not particularly limited to. Specific examples of the compound having a mercapto group and a reactive silicon group include γ-mercaptopropyltrimethoxysilane, γ-mercaptopropylmethyldimethoxysialne, γ-mercaptopropyltriethoxysilane, γ-mercaptopropylmethyldiethoxysilane, mercaptomethyltriethoxysilane and the like. However, the compound is not limited thereto.

Out of variations of the synthesis method (C), the method of causing a polymer having a hydroxyl group at its terminal to react with a compound having an isocyanate group and a reactive silicon group may be, for example, a method disclosed in JP-A-3-47825. However, the method is not particularly limited to. Specific examples of the compound having an isocyanate group and a reactive silicon group include γ-isocyanatepropyltrimethoxysilane, γ-isocyanatepropyldimethoxymethylsilane, γ-isocyanatepropyltriethoxysilane, γ-isocyanatepropyldiethoxymethylsilane, isocyanatemethyltrimethoxysilane, isocyanatemethyltriethoxysilane, isocyanatemethyldimethoxymethylsilane, isocyanatemethyldiethoxymethylsilane and the like. However, the compound is not limited thereto.

As described above, a silane compound wherein three hydrolyzable groups are bonded to a single silicon atom, such as trimethoxysilane, may cause advance of disproportionation reaction. When the disproportionation reaction advances, a considerably dangerous compound such as dimethoxysilane may be generated.

However, such disproportionation reaction does not advance about γ-mercaptopropyltrimethoxysilane or γ-isocyanatepropyltrimethoxysilane. Therefore, in the case of using a silicon group wherein three hydrolyzable groups are bonded to a single silicon atom, such as a trimethoxy group, as the silicon-containing group, it is preferred to use the synthesis method (B) or (C).

The polymer having a reactive silicon group may be any polymer having a linear structure or a branched structure. The number-average molecular weight thereof is preferably from 3,000 to 100,000, more preferably from 3,000 to 50,000, and particularly preferably from 3,000 to 30,000 according to GPC for conversion into polystyrene molecular weight. When the number-average molecular weight is from 3,000 to 100,000, the curable composition has appropriate viscosity advantageous to workability, so as to give a cured product excellent in elongation property.

The number of reactive silicon groups contained in the polymer is, on average per molecule, at least one, preferably from 1.1 to 5. If the number of the reactive silicon groups contained per molecule is at least one on average, the curability of the curable composition becomes sufficient so that a good rubbery elasticity behavior of the resultant cured product is easily expressed. The reactive silicon groups may be present on a terminal of the main chain of the polymer(s) or a terminal of a side chain thereof, or may be present on both of the terminals. In particular, when the reactive silicon groups are present only on a terminal of the main chain of the molecular chain, a rubbery cured product exhibiting a high strength, a high elongation and a low elasticity is easily obtained since the effective network length of the polymer component(s) contained in the cured product, which is finally formed, becomes long.

The above-mentioned polyoxyalkylene polymers are each a polymer which essentially has a repeating unit represented by the following general formula (6):

$$—R^7—O— \quad (6)$$

(wherein $R^7$ is a linear or branched alkylene group having 1 to 14 carbon atoms). $R^7$ in the general formula (6) is preferably a linear or branched alkylene group having 1 to 14 carbon atoms, preferably 2 to 4 carbon atoms. Specific examples of the repeating unit represented by the general formula (6) include:

[Formula 1]

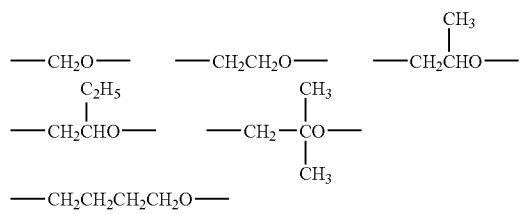

The main chain skeleton of the polyoxyalkylene polymer may be made of only one kind of repeating unit, or may be made of two or more kinds of repeating units. In the case that the composition is used, in particular, for a sealant, a material made of a polymer made mainly of a propylene oxide polymer is preferred since the material is amorphous and has a relatively low viscosity.

Examples of the method for synthesizing the polyoxyalkylene polymer include a method based on an alkali catalyst such as KOH, a method using, as a catalyst, a transition metal compound/porphyrin complex catalyst obtained by reaction between an organic aluminum compound and porphyrin, as described in JP-A-61-215623, a method using, as a catalyst, a double metal cyanide complex, as described in JP-B-46-27250, JP-B-59-15336, and U.S. Pat. Nos. 3,278,457, 3,278, 458, 3,278,459, 3,427,256, 3,427,334, 3,427,335, and other publications; a polymerization method using a catalyst made of a polyphosphazene salt, as exemplified in JP-A-10-273512; and a method using a catalyst made of a phosphazene compound, as exemplified in JP-A-11-060722. However, the method is not limited thereto.

Examples of the method for producing the polyoxyalkylene polymer having a reactive silicon group include methods suggested in JP-B-45-36319 and 46-12154, JP-A-50-156599, 54-6096, 55-13767, 55-13468 and 57-164123, JP-B-3-2450, and U.S. Pat. Nos. 3,632,557, 4,345,053, 4,366,307, 4,960,844, and other publications; and polymers having a high molecular weight (number-average molecular weight of 6,000 or more) and a narrow molecular weight distribution (Mw/Mn of 1.6 or less) as suggested in JP-A-61-197631, 61-215622, 61-215623, 61-218632, 3-72527, 3-47825, and 8-231707. However, the method is not particularly limited thereto and a known method may be used.

The above-mentioned polyoxyalkylene polymers having a reactive silicon group may be used alone or in combination of two or more thereof.

The saturated hydrocarbon polymers are each a polymer which does not substantially contain any carbon-carbon unsaturated bond other than those in an aromatic ring. The polymer which constitutes the skeleton thereof can be obtained by a method (1) of polymerizing, as a main monomer, an olefin compound having 2 to 6 carbon atoms, such as ethylene, propylene, 1-butene or isobutylene, a method (2) of homo-polymerizing a diene compound such as butadiene or isoprene, or copolymerizing the diene compound and one or more out of the above-mentioned olefin compounds, and then hydrogenating the homopolymer or copolymer, or some other methods. Isobutylene polymers or hydrogenated polybutadiene polymers are preferred since one or more functional groups can easily be introduced into a terminal thereof, the molecular weight thereof is easily controlled and further the number of the terminal functional groups can be made large. The isobutylene polymers are particularly preferred.

The polymer having a main chain skeleton made of a saturated hydrocarbon polymer has a very good characteristic in heat resistance, weather resistance, durability, and moisture blocking property.

The isobutylene polymers may each be a polymer wherein all of their monomer units are isobutylene units, or a copolymer made from isobutylene units and a different monomer. From the viewpoint of rubbery characteristics, the repeating units originating from isobutylene are contained preferably in an amount of 50% or more by weight, more preferably in an amount of 80% or more by weight, in particular preferably in an amount of 90 to 99%.

As the method for synthesizing the saturated hydrocarbon polymer, hitherto various polymerization methods have been reported. In recent years, in particular, a large number of, what is called, living polymerizations have been developed. In the case of a saturated hydrocarbon polymer, in particular, an isobutylene polymer, the following are known: the polymer can easily be produced by using inifer polymerization found out by Kennedy et al. (J. P. Kennedy et al., J. Polymer Sci., Polymer Chem. Ed. 1997, vol. 15, 2843); the polymer can be produced by polymerization, so as to have a molecular weight of about 500 to 100,000 and a molecular weight distribution of 1.5 or less; and various functional groups can be introduced into a terminal of the molecule.

The method for synthesizing the saturated hydrocarbon polymer having a reactive silicon group is described in, for example, JP-B-4-69659 and 7-108928, JP-A-63-254149, 64-22904 and 1-197509, Japanese Patent Official Gazette Nos. 2539445 and 2873395, JP-A-7-538382, and other publications. However, the method is not particularly limited thereto.

The above-mentioned saturated hydrocarbon polymers having a reactive silicon group may be used alone or in combination of two or more thereof.

The (meth)acrylate monomer which constitutes the main chain of the above-mentioned (meth)acrylate polymers is not particularly limited to, and various monomers can be used. Examples thereof include (meth) acrylic acid based monomers such as (meth)acrylic acid, methyl (meth)acrylate, ethyl (meth)acrylate, n-propyl(meth)acrylate, isopropyl(meth) acrylate, n-butyl (meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, tolyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl (meth)acrylate, stearyl(meth)acrylate, glycidyl (meth)acrylate, γ-(methacryloyloxypropyl)trimethoxysilane, γ-(methacryloyloxypropyl)dimethoxymethylsilane, an ethylene oxide adduct of (meth)acrylic acid, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, perfluoroethyl(meth) acrylate, trifluoromethyl(meth)acrylate, bis(trifluoromethylmethyl)(meth)acrylate, 2-trifluoromethyl-2-perfluoroethylethyl(meth)acrylate, 2-perfluorohexylethyl (meth)acrylate, 2-perfluorodecylethyl(meth)acrylate, 2-perfluorohexadecylethyl(meth)acrylate and the like.

In the (meth)acrylate polymers, any (meth)acrylate monomer may be copolymerized with a vinyl monomer, which will be described hereinafter. Examples of the vinyl monomer include styrene monomers such as styrene, vinyltoluene, α-methylstyrene, chlorostyrene, styrenesulfonic acid and salts thereof, and the like; fluorine-containing vinyl monomers such as perfluoroethylene, perlfluoropropylene, fluorinated vinylidene and the like; silicon-containing vinyl monomers such as vinyltrimethoxysilane, vinyltriethoxysilane and the like; maleic anhydride, maleic acid, and monoalkyl esters and dialkyl esters of maleic acid; fumaric acid, monoalkyl ester and dialkyl ester of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile-group-containing vinyl monomers such as acrylonitrile, methacrylonitrile and the like; amide-group-containing vinyl monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; and vinyl chloride, vinylidene chloride, allyl chloride, allyl alcohol and the like. These may be used alone, or plural ones thereof may be copolymerized.

Among (meth)acrylate polymers obtained from the above compounds, a polymer (A) having, as its main chain skeleton, a copolymer composed of a styrene based compound and a (meth) acrylic acid based compound is preferred since a cured product excellent in physical properties can be obtained. More preferred is a polymer (A) having, as its main chain skeleton, a copolymer composed of an acrylic acid ester based compound and a methacrylic acid ester based compound. Particularly preferred is a polymer having, as its main chain skeleton, a copolymer composed of an acrylic acid ester based compound.

When the curable composition is used for ordinary building or the like, it is required that the curable composition has low viscosity and the resultant cured product has low modulus, high elongation, weather resistance, heat resistance, and the like.

As the composition satisfying these requirements, more preferred is a composition wherein the main chain skeleton of the polymer (A) is a butyl acrylate based compound.

On the other hand, when the curable composition is used for automobiles or the like, the resultant cured product is required to be excellent in oil resistance or the like.

The curable composition in which the resultant cured product is excellent in oil resistance is more preferably a composition wherein the main chain skeleton of the polymer (A) is a copolymer composed mainly of ethyl acrylate.

In this curable composition, which has the polymer (A) containing, as its main chain skeleton, a copolymer composed mainly of ethyl acrylate, the resultant cured product is excellent in oil resistance, but tends to be slightly poor in low temperature property (cold resistance). In order to improve the low temperature property, a part of ethyl acrylate is represented by butyl acrylate. However, as a ratio of butyl acrylate is made larger, the good oil resistance tends to be further damaged. For this reason, when the composition is used for an application required to have oil resistance, the ratio is set preferably to be 40% or less, and more preferably to be 30% or less.

In order to improve the low-temperature property and the like without damaging the oil resistance, it is also preferred to use, as a copolymer component, a component wherein oxygen is introduced into an alkyl group of its side chain, such as 2-methoxyethyl acrylate and 2-ethoxyethyl acrylate.

However, when the alkoxy group, which has an ether bond, is introduced into the side chain, the resultant cured product tends to be poor in heat resistance, and therefore, when the composition is used for an application required to have heat resistance, the ratio of butyl acrylate is set preferably to be 40% or less.

For various application or purposes to be required, an appropriate polymer can be obtained by varying the ratio of butyl acrylate, considering physical properties such as oil resistance, heat resistance and low-temperature property to be required. An example excellent in the balance between physical properties such as oil resistance, heat resistance and low temperature property includes, but is not limited to, a copolymer composed of ethyl acrylate, butyl acrylate and 2-methoxyethyl acrylate (ratio by weight: 40-50/20-30/30-20). In the present invention, these preferred monomers may be copolymerized with a different monomer, and may further be block-copolymerized therewith. At this time, it is preferred that these preferred monomers are contained in a proportion by weight of 40% or more. In the above expression format, for example, (meth)acrylic acid refers to acrylic acid and/or methacrylic acid.

The method for synthesizing such a (meth)acrylate polymer is not particularly limited to, and may be a known method. However, the polymer obtained by an ordinary free-radical polymerization method using an azo compound, a peroxide or the like as a polymerization initiator has a problem that the value of the molecular weight distribution is generally as large as 2 or more, and the viscosity becomes high. Accordingly, it is preferred to use a living radical polymerization method in order to yield a (meth)acrylate polymer having a narrow molecular weight distribution and a low viscosity and containing, at a terminal of the molecule chain thereof, a crosslinkable functional group at a high content by percentage.

Out of variations of the "living radical polymerization method", the "atom transfer radical polymerization method" of polymerizing the (meth)acrylate monomer, using an organic halide, halogenated sulfonyl compounds or the like as an initiator and a transition metal complex as a catalyst, is more preferred as a method for producing a (meth)acrylate polymer having a specific functional group since the terminal has a halogen or the like, which is relatively advantageous for functional-group-converting reaction, and the flexibility in design of the initiator or the catalyst is large as well as the characteristics of the above-mentioned "living polymerization method" are exhibited. This atom transfer radical polymerization method is described in, for example, Matyjaszewski et al., J. Am. Chem. Soc., 1995, vol. 117, 5614.

As the method for producing the (meth)acrylate polymer having a reactive silicon group, a production process using a free radical polymerization method using a chain transfer agent is disclosed in, for example, JP-B-3-14068 and 4-55444, and JP-A-6-211922. JP-A-9-272714 and others disclose a production process using an atom transfer radical polymerization method. However, the method is not particularly limited thereto.

The above-mentioned (meth)acrylate polymers having a reactive silicon group may be used alone or in combination of two or more thereof.

These polymers having a reactive silicon group may used alone or in combination of two or more thereof. Specifically, it is allowable to use a polymer obtained by blending two or more selected from the group consisting of the polyoxyalkylene polymers having a reactive silicon group, the saturated hydrocarbon polymers having a reactive silicon group, and the (meth)acrylate polymers having a reactive silicon group.

The method for producing a polymer wherein a polyoxyalkylene polymer having a reactive silicon group is blended with a (meth)acrylate polymer having a reactive silicon group is suggested in JP-A-59-122541, 63-112642, 6-172631 and 11-116763, and other publications. However, the method is not particularly limited thereto. A preferred specific example thereof is a method of blending a polyoxyalkylene polymer having a reactive silicon group with a copolymer which has a reactive silicon group and has a molecular chain composed substantially of (meth)acrylate monomer units each having 1 to 8 carbon atoms and represented by the following general formula (7)

  (7)

(wherein $R^8$ represents a hydrogen atom or a methyl group, and $R^9$ represents an alkyl group having 1 to 8 carbon atoms), and (meth)acrylate monomer units each having an alkyl group having 10 or more carbon atoms and represented by the following general formula (8):

  (8)

(wherein $R^8$ has the same meaning as described above, and $R^{10}$ represents an alkyl group having 10 or more carbon atoms).

Examples of $R^9$ in the general formula (7) include alkyl groups having 1 to 8 carbon atoms, preferably 1 to 4 carbon atoms, more preferably 1 to 2 carbon atoms, such as a methyl, ethyl, propyl, n-butyl, t-butyl, and 2-ethylhexyl group. The alkyl groups as $R^9$ may be used alone or in the form of a mixture of two or more thereof.

Examples of $R^{10}$ in the general formula (8) include long-chain alkyl groups having 10 or more carbon atoms, usually 10 to 30 carbon atoms, preferably 10 to 20 carbon atoms, such as lauryl, tridecyl, cetyl, stearyl, and behenyl groups. The alkyl groups as $R^{10}$ may be used alone or in the form of a mixture of two or more thereof.

The molecular chain of the (meth)acrylate based copolymer is composed substantially of the monomer units of the formulae (7) and (8). The word "substantially" referred to herein means that the total amount of the monomer units of the formulae (7) and (8) present in the copolymer is over 50% by weight. The total amount of the monomer units of the formulae (7) and (8) is preferably 70% or more by weight.

The presence ratio by weight of the monomer units of the formula (7) to the monomer units of the formula (8) is preferably from 95/5 to 40/60, more preferably from 90/10 to 60/40.

Examples of a monomer unit which is different from the monomer units of the formulae (7) and (8) and may be contained in the copolymer include acrylic acids such as acrylic acid, methacrylic acid and the like; monomers containing an amide group, such as N-methylolacrylamide, N-methylolmethacrylamide and the like, those containing an epoxy group, such as glycidyl acrylate, glycidyl methacrylate and the like, and those containing a nitrogen-containing group, such as diethylaminoethyl acrylate, diethylaminoethyl methacrylate and the like; and other monomer units originating from acrylonitrile, styrene, α-methylstyrene, alkyl vinyl ether, vinyl chloride, vinyl acetate, vinyl propionate, ethylene, or the like.

A polymer wherein a saturated hydrocarbon polymer having a reactive silicon group is blended with a (meth)acrylate copolymer having a reactive silicon group is suggested in JP-A-1-168764 and 2000-186176, and other publications. However, the polymer is not limited thereto.

A different example of the method for producing a polymer containing, as a blend component, a (meth)acrylate copolymer having a reactive silicon functional group is a method of polymerizing a (meth)acrylate monomer in the presence of a polymer having a reactive silicon group. This production method is specifically disclosed in JP-A-59-78223, 59-168014, 60-228516 and 60-228517, and other publications. However, the method is not limited thereto.

On the other hand, the main chain skeleton of the polymer(s) may contain a different component such as a urethane bond component as long as the advantageous effects of the present invention are not largely damaged.

The urethane bond component is not particularly limited to, and an example thereof is a group generated by reaction between an isocyanate group and an active hydrogen group (and the group may be referred to as an amide segment hereinafter)

The amide segment is represented by the following general formula (9):

$$—NR^{11}—C(=O)—  \quad (9)$$

(wherein $R^{11}$ represents a hydrogen atom or a substituted or unsubstituted organic group).

Specific examples of the amide segment include a urethane group generated by reaction between an isocyanate group and a hydroxyl group; a urea group generated by reaction between an isocyanate group and an amino group; and a thiourethane group generated by reaction between an isocyanate group and a mercapto group, and the group. In the present invention, groups generated by causing the active hydrogen occurring in the urethane group, the urea group and the thiourethane group to react further with an isocyanate group are also contained in the category of the group of the formula (9).

An example of the method for producing a polymer having an amide segment and a reactive silicon group with industrial ease is a method of causing a polymer having an active-hydrogen-containing group as its terminal to react with an excessive amount of a polyisocyanate compound to prepare a polymer having an isocyanate group at its polyurethane main chain terminal, and subsequently or simultaneously causing a part or the whole of individuals of the isocyanate group to react with a U group of a silicon compound represented by the following general formula (10):

$$U—R^{12}—SiR^3{}_{3-d}Z_d \quad (10)$$

(wherein $R^3$, Z and d have the same meanings as described above, and $R^{12}$ is a bivalent organic group, more preferably a substituted or unsubstituted bivalent hydrocarbon group having 1 to 20 carbon atoms; and U is an active-hydrogen-containing group selected from hydroxyl, carboxyl, mercapto, and mono-substituted or unsubstituted amino groups), thereby producing the polymer. Examples of known polymer-producing methods related to this production method include methods disclosed in JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), JP-A-2003-508561 as Japanese Patent Application National Publication (U.S. Pat. No. 6,197,912), JP-A-6-211879 (U.S. Pat. No. 5,364,955), JP-A-10-53637 (U.S. Pat. No. 5,756,751), JP-A-11-100427, 2000-169544, 2000-169545 and 2002-212415, Japanese Patent No. 3313360, U.S. Pat. Nos. 4,067,844 and 3,711,445, and JP-A-2001-323040, and other publications.

Another example of the above-mentioned method is a method of causing a polymer having an active-hydrogen-containing group at its terminal to react with a reactive-silicon-group-containing isocyanate compound represented by the following general formula (11):

$$O=C=N—R^{12}—SiR^3{}_{3-d}Z_d \quad (11)$$

(wherein $R^3$, $R^{12}$, Z and d have the same meanings as described above), thereby producing the polymer. Examples of known polymer-producing methods related to this production method include methods disclosed in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, 2002-155145 and 2002-249538, WO 03/018658, WO 03/059981 and other publications.

Examples of the polymer having an active-hydrogen-containing group at its terminal include oxyalkylene polymer having a hydroxyl group at its terminal (polyetherpolyol), polyacrylpolyol, polyesterpolyol, saturated hydrocarbon polymer having a hydroxyl group at its terminal (polyolefinpolyol), polythiol compounds, polyamine compounds, polyalkyleneimine, polysiloxane and the like. Among them, polyetherpolyol, polyacrylpolyol, polyolefinpolyol, and polysiloxane are preferred since the resultant polymer has a relatively high glass transition temperature and the resultant cured product has very good cold resistance. The polyetherpolyol is particularly preferred since the resultant polymer has a low viscosity to exhibit a good workability and the depth curability thereof is good. The polyacrylpolyol and the saturated hydrocarbon polymers are more preferred since the cured product of the resultant polymer has good weather resistance and heat resistance.

As the polyetherpolyol, polyetherpolyol that is produced by any method can be used. Preferred is polyetherpolyol having, at its terminal, a hydroxyl group the number of individuals of which is at least 0.7 per molecular terminal on the average of all the molecules. Specific examples thereof include oxyalkylene polymer produced by use of a conventional alkali metal catalyst; and oxyalkylene polymer produced by causing an initiator such as a polyhydroxy compound, which has at least two hydroxyl groups, to react with an alkylene oxide in the presence of a double metal cyanide complex or cesium.

Out of the above-mentioned polymerization methods, the polymerization method using a double metal cyanide complex is preferred since the method makes it possible to yield oxyalkylene polymer having a lower unsaturated degree, a narrow Mw/Mn, a lower viscosity, a high acid resistance and a high weather resistance.

The polyacrylpolyol may be a polyol having a skeleton of an alkyl(meth)acrylate (co)polymer and having in the molecule thereof a hydroxyl group. The method for synthesizing the polymer is preferably a living radical polymerization method since a polymer having a narrow molecular weight distribution and a low viscosity can be obtained. An atom transfer radical polymerization method is more preferred. It is also preferred to use a polymer based on the so-called SGO process, which is obtained by subjecting an alkyl acrylate ester monomer described in JP-A-2001-207157 to continuous bulk polymerization at high temperature and high pressure. A specific example thereof is a "UH-2000" manufactured by Toagosei Co., Ltd or the like.

Specific examples of the above-mentioned polyisocyanate compound include aromatic polyisocyanates such as toluene (tolylene)diisocyanate, diphenylmethane diisocyanate, xylylene diisocyanate and the like; and aliphatic polyisocyanates such as isophoronediisocyanate, and hexamethylenediisocyanate and the like.

The silicon compound of the general formula (10) is not particularly limited to, and specific examples thereof include amino-group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, N-phenylaminomethyltrimethoxysilane and the like; hydroxy-group-containing silanes such as γ-hydroxypropyltrimethoxysilane and the like; and mercapto-group-containing silanes such as γ-mercaptopropyltrimethoxysilane and the like, and the like. As described in JP-A-6-211879 (U.S. Pat. No. 5,364,955), JP-A-10-53637 (U.S. Pat. No. 5,756,751), JP-A-10-204144 (EP 0831108), and JP-A-2000-169544 and 2000-169545, the following can also be used as the silicon compound of the general formula (10): Michael addition reactants made from a variety of α,β-unsaturated carbonyl compounds and an amino-group-containing silane; and Michael addition reactants made from a variety of (meth) acryloyl-group-containing silanes and an amino-group-containing compound.

The reactive-silicon-group-containing isocyanate compound of the general formula (11) is not particularly limited to, and specific examples thereof include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, dimethoxymethylsilylmethylisocyante and the like. As described in JP-A-2000-119365 (U.S. Pat. No. 6,046,270), a compound obtained by causing a silicon compound of the general formula (10) to react with an excessive amount of the above-mentioned polyisocyanate compound can also be used as the reactive-silicon-group-containing isocyanate compound of the general formula (11).

When the amount of the amide segment in the main chain skeleton of the polymer(s) which is/are the component (A) in the present invention is large, the viscosity of the polymer tends to be high. After the storage of the polymer(s), the viscosity may also rise so that the workability of the resultant composition may lower. Accordingly, in order to obtain a composition having very good storage stability and workability, it is preferred that the amide segment is not substantially contained therein. On the other hand, the amide segment in the main chain skeleton of the component (A) tends to cause an improvement in the curability of the composition of the present invention. Accordingly, when the main chain skeleton of the component(s) (A) contains an amide segment, the number of individuals of the amide segment is preferably from 1 to 10, more preferably from 1.5 to 5, in particular preferably from 2 to 3 per molecule on the average. If the number is less than 1, the curability may be sufficient. If the number is more than 10, the polymer becomes highly viscous so that a composition poor in workability may be obtained.

Among the polymers produced by the above method using the compound of the general formula (10) or (11), a polymer composed of a compound wherein $R^{12}$ is —$CH_2$— tends to exhibit a particularly excellent curability.

The curable composition of the present invention contains, as essential components thereof, fluorosilanes (B) represented by general formula (1):

$$R^1_{4-a}SiF_a \qquad (1)$$

(wherein $R^1$'s, the number of which is 4-a, are each independently a substituted or unsubstituted hydrocarbon group having 1 to 20 carbon atoms, or at least one selected from the group consisting of siloxy groups represented by $R^2_3SiO$— (wherein $R^2$'s are each independently a substituted or unsubstituted hydrocarbon group having 1 to 20 carbon atoms or a fluorine atom), and a is any of 1, 2 or 3); and an amine compound (C) as curing catalysts for a polymer having a reactive silicon group (the component (B) and the component (C)).

Even if each of the component (B) and the component (C) is used alone, the component can act as a curing catalyst; however, in order to give a sufficient curing performance, it is necessary to use the components together.

JP-A-8-104753 and the like have already disclosed a compound having a Si—F bond as a catalyst for hydrolyzing/condensing an alkoxysilane to produce an organopolysiloxane. It is considered that the hydrolyzing/condensing catalyst described in the patent publication and the like, and the curing catalyst for the polymer having a reactive silicon group, which is the component (A) in the present invention, essentially act as a catalyst for the same reaction. However, specific examples wherein the fluorosilanes, which is the component (B) in the present invention, are used as curing catalysts for the polymer having a reactive silicon group have not yet been known. Before the completion of the present invention, the inventors actually used the fluorosilane (B) alone as a curing catalyst for the polymer (A), and as a result, it was made clear that only very low reactivity was exhibited.

On the other hand, the amine compound that is the component (C) in the present invention has also already been known as a curing catalyst for the polymer having a reactive silicon group. However, the curing performance thereof is not necessarily sufficient. In order to give a practical curing speed, it was necessary to make a device of using the component (C) together with a carboxylic acid or the like, as disclosed in JP-A-05-117519.

It has been found out in the present invention that when the fluorosilanes of the component (B) and the amine compound of the component (C) are used together, a high curing performance that cannot be gained by each of the components alone can be gained.

The fluorosilanes of the component (B), which is used in the present invention, may be a commercially available agent or may be synthesized from a raw material compound. Examples of the raw material compound for synthesizing the fluorosilanes include alkoxysilanes, siloxanes, halosilanes (except fluorosilanes), and hydrosilanes. Fluorosilanes of the interest can be obtained by using various fluorinating agents to convert alkoxysilyl groups, siloxane bonds, halosilyl groups, and hydrosilyl groups, respectively, to fluorosilyl groups by known methods.

Specific examples of the fluorinating agents used for fluorinating the alkoxysilanes include, but are not particularly limited to, such as $NH_4F$, $Bu_4NF$, HF, $BF_3$, $Et_2NSF_3$, $HSO_3F$, $SbF_6$, $VOF_3$ and $CF_3CHFCF_3NEt_2$. Specific examples of the fluorinating agents used for fluorinating the halosilanes include, but are not particularly limited to, such as $AgBF_4$, $SbF_3$, $ZnF_2$, NaF, KF, CsF, $NH_4F$, $CuF_2$, $NaSiF_6$, $NaPF_6$, $NaSbF_6$, $NaBF_4$, $MO_3SnF$, and $KF(HF)_{1.5-5}$. Furthermore, specific examples of the fluorinating agents used for fluorinating the hydrosilanes include, but are not particularly limited to, AgF, $PF_5$, $Ph_3CBF_4$, $SbF_3$, $NOBF_4$, and $NO_2BF_4$. Moreover, the compounds having a siloxane bond are cleaved with $BF_3$ or the like, so as to give fluorosilanes.

The fluorination is introduced in Organometallics 1996, 15, p. 2478 (Ishikawa et al.), and the like.

Among the methods for synthesizing the fluorsilanes using these fluorinating agents, preferred is a method of fluorinating an alkoxysilane using $BF_3$, or a method of fluorinating chlorosilane using $CuF_2$ or $ZnF_2$ since the reaction is simple, the reaction efficiency is high, the safety is high, and the like.

As $BF_3$, such as $BF_3$ gas, $BF_3$ ether complexes, $BF_3$ thioether complexes, $BF_3$ amine complexes, $BF_3$ alcohol complexes, $BF_3$ carboxylic acid complexes, $BF_3$ phosphoric acid complexes, and $BF_3$ hydrates can be used. Preferred are $BF_3$ ether complexes, $BF_3$ thioether complexes, $BF_3$ amine complexes, $BF_3$ alcohol complexes, $BF_3$ carboxylic acid complexes, and $BF_3$ hydrates, because they are easy to handle, and the like. Among these complexes, $BF_3$ ether complexes, $BF_3$ alcohol complexes, and $BF_3$ hydrates are more preferred since the reactivity thereof is high, and $BF_3$ ether complexes are particularly preferred.

Specific examples of the fluorosilanes, which is the component (B), include, but are not limited to, such as fluorotrimethylsilane, fluorotriethylsilane, fluorotripropylsilane, fluorotributylsilane, fluorodimethylvinylsilane, fluorodimethylphenylsilane, fluorodimethylbenzylsilane, fluorodimethyl(3-methylphenyl)silane, fluorodimethyl(4-methylphenyl)silane, fluorodimethyl(4-chlorophenyl)silane, fluorotriphenylsilane, difluorodimethylsilane, difluorodiethylsilane, difluorodibutylsilane, difluoromethylphenylsilane, difluorodiphenylsilane, trifluoroethylsilane, trifluoropropylsilane, trifluorobutylsilane, trifluorophenylsilane, γ-methacryloxypropylfluorodimethylsilane, γ-methacryloxypropyldifluoromethylsilane, γ-methacryloxypropyltrifluorosilane, 3-mercaptopropyltrifluorosilane, octadecylfluorodimethylsilane, octadecyldifluoromethylsilane, octadecyltrifluorosilane, 1,3-difluoro-1,1,3,3-tetramethyldisiloxane, tetrafluorosilane, octafluorotrisilane, 1,3,5,7-tetrafluoro-1,3,5,7-tetrasilatricyclo[3.3.1.1(3,7)]decane, 1,1-difluoro-1-silacyclo-3-pentene, and fluorotris(trimethylsiloxy)silane.

Of these examples, preferred are fluorodimethylvinylsilane, fluorodimethylphenylsilane, fluorodimethylbenzylsilane, γ-methacryloxypropylfluorodimethylsilane, γ-methacryloxypropyldifluoromethylsilane, γ-methacryloxypropyltrifluorosilane, 3-mercaptopropyltrifluorosilane, octadecylfluorodimethylsilane, octadecyldifluoromethylsilane, octadecyltrifluorosilane, 1,3-difluoro-1,1,3,3-tetramethyldisiloxane and the like since the raw materials are easily available, they are easily synthesized and the like.

If the molecular weight of the component (B) becomes large, there is the case where the addition amount required to gain a sufficient effect may increase. Thus, economic disadvantages may be generated. Accordingly, the molecular weight of the component (B) is preferably 3000 or less. The component (B) is preferably a liquid state at normal temperature and normal pressure and is preferably low in volatility from the viewpoint of handleability and safety. The component (B) may be used alone, or two or more kinds may be used in combination.

The use amount of the component (B) is preferably from 0.001 to 20 parts by weight, more preferably from 0.01 to 10 parts by weight, and particularly preferably from 0.1 to 5 parts by weight based on 100 parts by weight of the component (A). When the use amount of the component (B) is from 0.001 to 20 parts by weight, it is a range that is economically sufficiently practicable and the curable composition is a composition having an appropriate curing speed and a work life, so as to have a good workability. Moreover, deterioration in the curing speed by the storage can be suppressed. Thus, a restriction of use-by date does not give any practical problem, either.

The amine compound which is the component (C) includes, in the category thereof, nitrogen-containing cyclic compounds such as pyridine and the like. Specific examples of the amine compound (C) include aliphatic primary amines such as methylamine, ethyl amine, propylamine, isopropylmine, butylamine, amylamine, hexylamine, octylamine, 2-ethylhexylamine, nonylamine, decylamine, laurylamine, pentadecylamine, cetylamine, stearylamine, cyclohexylamine and the like; aliphatic secondary amides such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, butylstearylamine and the like; aliphatic tertiary amines such as triamylamine, trihexylamine, trioctylamine and the like; aliphatic unsaturated amines such as triallylamine, oleylamine and the like; aromatic amines such as aniline, lauryllaniline, stearylaniline, triphenylamine and the like; and heterocyclic amines such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,2-dimethyl-1,4,5,6-tetrahydropyrimidine, 1,8-diazabicyclo(5,4,0)undecene-7 (DBU), 6-(dibuthylamino)-1,8-diazabicyclo(5,4,0)undecene-7 (DBA-DBU), 1,5-diazabicyclo(4,3,0)nonene-5 (DBN), 1,4-diazabicyclo(2,2,2)octane (DABCO), aziridine and the like; and other amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 3-morpholinopropylamine, 2-(1-piperazinyl)ethylamine, xylylenediamine, 2,4,6-tris(dimethylaminomethyl)phenol and the like; guanidines such as guanidine, phenylguanidine, diphenylguanidine and the like; biguanides such as buthylbiguanide, 1-o-tolylbiguanide, 1-phenylbiguanide and the like; and the like. However, the amine compound is not limited thereto.

Among these examples, preferred are amidines such as 1,2-dimethyl-1,4,5,6-tetrahydropyrimidine, DBU, DBA-DBU, DBN and the like; guanidines such as guanidine, phenylguanidine, diphenylguanidine and the like; and biguanides such as butylbiguanide, 1-o-tolylbiguanide, 1-phenylbiguanide and the like, since they exhibit high catalyst activity for the polymer that is the component (A). Preferred are also aryl-substituted biguanides such as 1-o-tolylbiguanide, 1-phenylbiguanide and the like, since the resultant cured product exhibits high adhesiveness.

Amine compounds exhibit basicity; an amine compound wherein the pKa value of the conjugate acid thereof is 11 or more is preferred since the catalyst activity to the polymer of the component (A) is high. In particular, DBU or DBN is particularly preferred since the compound is a base wherein the pKa value of the conjugate acid is 12 or more so as to exhibit a high catalyst activity.

As the amine compound of the component (C), an amino-group-containing silane coupling agent (hereinafter referred to as an aminosilane) can also be used in the present invention. The aminosilane is a compound having a group containing a silicon atom to which a hydrolyzable group is bonded (hereinafter referred to as a hydrolyzable silicon group), and a substituted or unsubstituted amino group. Examples of the substituent in the substituted amino group include alkyl, aralkyl and aryl groups. An example of the hydrolyzable silicon group may be a group wherein Z is a hydrolyzable group out of the groups represented by the general formula (2). Specific examples thereof are the groups which have been already exemplified as the hydrolyzable group. Methoxy and ethoxy groups are preferred from the viewpoint of the hydrolysis rate thereof.

The number of individuals of the hydrolyzable group bonded to a silicon atom in an aminosilane is preferably 2 or more, in particular preferably 3 or more.

Specific examples thereof include, but is not limited to, γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltrisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysialne, (2-aminoethyl)aminomethyltrimethoxysilane, N,N'-bis[3-(trimethoxysilyl)propyl]ethylenediamine and the like.

Among these aminosilanes, an aminosilane having an amino group (—NH$_2$) is preferred from the viewpoint of good curability. From the viewpoint of easy availability, preferred are γ-aminopropyltrimethoxysilane, γ-aminopropyltriethoxysilane, γ-aminopropylmethyldimethoxysilane, and γ-(2-aminoethyl)aminopropyltrimethoxysilane.

A ketimine which is hydrolyzed to generate the above-mentioned amine compound can also be used as the component (C) in the present invention.

About the amine compound of the component (C), only one species thereof may be used or two or more species thereof may be used together.

The use amount of the component (C) is preferably from 0.001 to 20 parts by weight, more preferably from 0.1 to 10 parts by weight for 100 parts by weight of the component (A). When the blend amount of the component (C) is from 0.001 to 20 parts by weight, the curable composition has an appropriate curing speed and work life, so that the workability thereof becomes good. Additionally, a limitation of duration of service does not become a problem in terms of practical characteristic since lowering of curing speed due to storing can be prevented.

In the present invention, an amine compound having a fluorosilyl group represented by —R$^1_{3-a}$SiF$_a$ wherein R$^1$'s have the same meanings described as in the general formula (1) fulfils both functions of the component (B) and the component (C). When such a compound is used as a curing catalyst, it can be expected to give a sufficient curing performance even used alone. Specific examples thereof include such as 3-aminopropylfluorodimethylsilane, and fluorodimethyl(4-dimethylaminophenyl)silane.

If necessary, a silane coupling agent may be added, as an adhesion-imparting agent, to the curable composition of the present invention.

The silane coupling agent referred to herein is a compound having, in the molecule thereof, a hydrolyzable silicon group and a functional group other than the silicon group. The agent exhibits a remarkable adhesiveness improving effect under a non-primer condition or primer-treatment condition when the agent is applied between a variety of substrates, that is, inorganic substrates/such as glass, aluminum, stainless steel, zinc, copper, mortar and the like; and organic substrates such as vinyl chloride, acrylic resin, polyester, polyethylene, polypropylene, polycarbonate and the like; and a cured product.

When the silane coupling agent is used under a non-primer condition, the effect of improving the adhesiveness of a cured product onto the various adherends is particularly remarkable. Besides, the silane coupling agent is a compound which can function as a physical property adjustor, an agent for improving the dispersibility of an inorganic filler, or some other agents.

An example of the hydrolyzable silicon group of the silane coupling agent is a group wherein Z is a hydrolyzable group out of the groups represented by the general formula (2). Specific examples thereof include the groups which are already exemplified in the embodiment of the polymer of the component (A). Among them, methoxy and ethoxy groups are preferred since the hydrolysis thereof is mild and they are easy handled. The silane coupling agent preferably has two or more hydrolyzable groups bonded to a silicon atom, and in particular preferably has three or more hydrolyzable groups.

Examples of the functional group other than the hydrolyzable silicon group include, but are not particularly limited to, substituted or unsubstituted amino, mercapto, epoxy, carboxyl, vinyl, and isocyanate groups, isocyanurate, halogens and others. Among them, substituted or unsubstituted amino, epoxy and isocyanate groups, and isocyanurate are preferred since they have a high adhesiveness improving effect of a cured product to be obtained. The amino groups are particularly preferred.

As already described in the embodiment of the amine compound of the component (C), a silane coupling agent having both a hydrolyzable silicon group and an amino group is generally referred to an aminosilane. In the present invention, the silane coupling agent also has a function as a curing catalyst. In adding an aminosilane to a curable composition, when the aminosilane is desired to exhibit a function as an adhesion-imparting agent more intensely, it is preferred to add the aminosilane in an amount more than that required as a curing catalyst.

Specific examples of the silane coupling agent other than aminosilanes include, but are not particularly limited to, isocyanate silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, (isocyanatemethyl)dimethoxymethylsilane and the like; ketimine type silanes such as N-(1,3-dimethylbutylidene)-3-(triethoxysilyl)-1-propanamine and the like; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane and the like; epoxysilanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane and the like; carboxysialnes such as β-carboxyethyltriethoxysilane, β-carboxyethylphenylbis(2-methoxyethoxy)silane, N-β-(carboxymethyl)aminoethyl-γ-aminopropyltrimethoxysilane and the like; vinyl-type-unsaturated-group-containing silanes such as vinyltrimethoxysilane, vinyltriethoxysilane, γ-methacryloyloxypropylmethyldimethoxysilane, γ-acryloyloxypropyltriethoxysilane and the like; halogen-containing silanes such as γ-chloropropyltrimethoxysilane and the like; and isocyanurate silanes such as tris(3-trimethoxysilylpropyl) isocyanurate and the like, and the like.

Further, examples of the silane coupling agent include reactants of the aminosilanes and an epoxysilane, reactants of an aminosilane and an isocyanatesilane, and reactants of an aminosilane and a silane having a (meth)acryloyloxy group; condensed products wherein the above silanes are partially condensed; and derivatives obtained by modifying these materials, such as amino-modified silylpolymers, sililated aminopolymers, unsaturated aminosilane complexes, phenylamino long-chain alkylsilanes, aminosililated silicones, and sililated polyesters; and the like.

The silane coupling agents may be used alone or in the form of a mixture of two or more thereof.

When the silane coupling agent is added, the addition amount thereof is preferably from about 0.01 to 20 parts by weight, more preferably from about 0.1 to 10 parts by weight, and particularly preferably from about 1 to 7 parts by weight based on 100 parts by weight of the polymer that is the component (A). If the addition amount is less than 0.1 parts by weight, the adhesiveness of the resultant cured product tends not to be sufficiently gained. On the other hand, if the amount is more than 20 parts by weight, the curable composition tends not to gain a practical curing speed and further the curing reaction tends not to be easily sufficiently proceeded.

An adhesion-imparting agent other than the silane coupling agent mentioned above can be added to the composition of the present invention if necessary. As the adhesion-imparting agent other than the silane coupling agent, which is not particularly limited to, the following can be used besides the above-mentioned silane coupling agent: for example, an epoxy resin, a phenol resin, sulfur, an alkyl titanate, an aromatic polyisocyanate and others. The adhesion-imparting agent may be used alone or in the form of a mixture of two or more thereof.

In the present invention, a different curing catalyst can be added, if necessary, when the advantageous effects of the present invention are not lowered.

Specific examples include carboxylic acids such as acetic acid, propionic acid, butyric acid, 2-ethylhexanoic acid, lauric acid, stearic acid, oleic acid, linoleic acid, pivalic acid, 2,2-dimethylbutyric acid, 2,2-diethylbutyric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid and other acids; derivatives of the carboxylic acids (carboxylic anhydrides, esters, amides, nitriles and acyl chlorides); metal carboxylates such as tin carboxylate, lead carboxylate, bismuth carboxylate, potassium carboxylate, calcium carboxylate, barium carboxylate, titanium carboxylase, zirconium carboxylate, hafnium carboxylate, vanadium carboxylate, manganese carboxylate, iron carboxylate, cobalt carboxylate, nickel carboxylate, cerium carboxylate and other carboxylates; titanium compounds such as tetrabutyl titanate, tetrapropyl titanate, titanium tetrakis(acetylacetonate), bis(acetylacetonate)diisopropoxytitanium, diisopropoxytitaniumbis(ethylacetonate) and other titanates; organictin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), a reactant of dibutyltin oxide and a silicate compound, and a reactant of dibutyltin oxide and a phthalic acid ester and other tin compounds; aluminum compounds such as aluminum tris(acetylacetonate), aluminum tris(ethylacetoacetate), and diisopropoxyaluminum methylacetoacetate and other aluminum compounds; zirconium compounds such as zirconium tetrakis(acetylacetonate) and the like; various metal alkoxides such as tetrabutoxyhafnium and the like; organic acidic phosphates; organic sulfonic acids such as trifluoromethanesulfonic acid and the like; and inorganic acids such as hydrochloric acid, phosphoric acid, boronic acid and other acids; Lewis acids such as halogenated metal compounds including aluminum chloride, titanium chloride, zirconium chloride, zinc chloride, zinc bromide, iron chloride, copper chloride, antimony chloride, tin chloride and the like; triflates including metal triflates such as indium triflate, tin triflate, trialkylsilyltriflate and the like; and the derivatives thereof.

When any one of these curing catalysts is used together, the catalyst activity becomes high and an improvement of resultant cured products is expected in depth curability, thin-layer curability, adhesiveness, and others. However, if the amount of the added carboxylic acid is large, a sufficient adhesiveness of resultant cured products may not be obtained.

As the addition amount of the organictin compound increases, there is a case that the restorability, the durability and the creep resistance of the resultant cured product deteriorate or the toxicity thereof increases.

Therefore, when the organictin compound is added, the addition amount thereof is preferably 5 parts or less by weight, more preferably 0.5 parts or less by weight, even more preferably 0.05 parts or less by weight, and particularly preferably no containing based on 100 parts by weight of the polymer that is the component (A).

A filler can be added to the cured composition of the present invention if necessary. Examples of the filler include, but are not particularly limited to, reinforced fillers such as fumed silica, precipitated silica, crystalline silica, fused silica, dolomite, silicic anhydride, hydrated silicic acid, and carbon black and the like; ground calcium carbonate, colloidal calcium carbonate, magnesium carbonate, diatomaceous earth, calcined clay, clay, talc, titanium oxide, bentonite, organic bentonite, ferric oxide, aluminum fine powder, flint powder, zinc oxide, active zinc white, shirasu balloon, glass micro-balloon, organic micro-balloon made of phenol resin or vinylidene chloride resin, PVC powder, PMMA powder, and other organic powders; and fibrous fillers such as asbestos, glass fiber, and filament and the like.

When the filler is used, the use amount thereof is from 1 to 250 parts by weight, preferably from 10 to 200 parts by weight for 100 parts by weight of the polymer(s) of the component(s) (A).

When the curable composition is used for a one-part-type adhesive, sealant, or the like, in order to gain a good storage stability, it is preferred to mix the above filler and a dehydrating agent, such as calcium oxide, with a homogeneous state as disclosed in JP-A-2001-181532 and the like, subsequently putting the resultant mixture into a bag made of a hermetic material and allow the resultant to stand still for an appropriate time, thereby dehydrating and drying the curable composition in advance, and then add the composition.

In addition, when the resultant cured product is used for an application required to have transparency, the filler to be added is preferably a polymeric powder made of a polymer disclosed in JP-A-11-302527 and the like, such as methyl methacrylate, amorphous silica, or the like. The filler is more preferably hydrophobic silica disclosed in JP-A-2000-38560 and the like.

The hydrophobic silica referred to herein is a material obtained by subjecting a surface of a fine powder of silicon dioxide, which is generally occupied by silanol groups (—SiOH), to treatment with an organic silicon halide, alcohols, or the like, thereby converting the silanol groups to a —SiO-hydrophobic group. The hydrophobic silica is not particularly limited to, and examples thereof include those in which silanol groups present on the surfaces of silicon dioxide fine powders are treated with dimethylsiloxane, hexamethyldisilazane, dimethyldichlorosilane, trimethoxyoctylsilane, trimethylsilane or the like. Untreated silicon dioxide fine powders, the surfaces of which are occupied by silanol groups (—SiOH), are referred to hydrophilic silica fine powders.

When a cured product to be obtained is used in an application wherein a high strength is desired, the filler is preferably a filler selected from silicon compounds such as fumed silica, precipitated silica, crystalline silica, fused silica, dolomite, silicic anhydride, hydrated silicic acid and the like; carbon black, surface-treated fine calcium carbonate, calcined clay, clay, active zinc white, and others. The added amount thereof is preferably 1 to 200 parts by weight for 100 parts by weight of the polymer of the component (A)

Further, when a cured product to be obtained is used in an application wherein a cured product having a low strength and a large elongation at break is desired, the filler is preferably a filler selected from titanium oxide, a calcium carbonate species such as ground calcium carbonate, magnesium carbonate, talc, ferric oxide, zinc oxide, shirasu balloon and the like. The added amount thereof is preferably 5 to 200 parts by weight for 100 parts by weight of the polymer of the component (A).

When calcium carbonate species are used, the effect of improving the strength at break, the elongation at break and the adhesiveness of the resultant cured product becomes larger as the value of the specific surface area thereof is larger.

Of course, these fillers may be used alone or in the form of a mixture of two or more thereof.

Examples of the addition of a plurality of additives are not particularly limited to, and it is preferred to use surface-treated fine calcium carbonate and calcium carbonate having a large particle diameter such as ground calcium carbonate, in combination, since various properties of the resultant cured product are excellent.

The surface-treated fine calcium carbonate is preferably calcium carbonate having a particle diameter of 0.5 µm or less and having particle surfaces treated with an aliphatic acid or a salt of an aliphatic acid.

In addition, the calcium carbonate having a large particle diameter is preferably calcium carbonate having a particle diameter of 1 µm or more and having untreated particle surfaces.

When the workability (such as cutting property) of the composition or making the surface of the resultant cured product mat is required, the filler to be added is preferably an organic balloon or inorganic balloon. These filler may be subjected to surface treatment. Only one species thereof may be used, or two or more species thereof may be used in a mixture form. To improve the workability (such as anti-sagging), the particle diameter of the balloons is preferably 0.1 mm or less. To make the cured product surface mat, the diameter is preferably from 5 to 300 µm.

The curable composition of the present invention is preferably used as a sealant for siding boards made of a ceramic or the like, for joints of outer walls of houses, or for outer wall tiles, an adhesive, or the like.

When the curable composition is used for such an application, the resultant cured product is present on outer faces, such as joint portions; thus, it is desired to match a design of outer walls with a design of the cured product. In particular, in recent years, outer walls giving a high-grade impression, such as sputtering-coated walls, and walls to which a colored aggregate or the like is added, have been used; thus, importance of the design of the cured product has been increasing.

In order to obtain a design giving a high-grade impression, a scaly or granular substance is added to the curable composition of the present invention. Here, the addition of a granular substance gives a sandy particle surface in a sand-scattered tone or in a sandstone tone, or the addition of a scaly substance gives an irregular surface resulting from the scaly form.

The resultant cured product matches with outer walls giving a high-grade impression, and is further excellent in chemical resistance. Thus, the cured product has a characteristic that its appearance giving a high-grade impression is kept for a long term.

The scaly or granular substance is not particularly limited to, and include, for example, a substance disclosed in JP-A-09-53063. The diameter thereof, which is appropriately selected in accordance with a material, a pattern or the like of the outer walls, is preferably 0.1 mm or more, more preferably from 0.1 to 5.0 mm. In the case of the scaly substance, the thickness is preferably ⅒ to ⅕ of the diameter (0.01 to 1.0 mm).

The addition amount of the scaly or granular substance is appropriately selected in accordance with the size of the scaly or granular substance, and the material, the pattern or the like of the outer walls, and is preferably from 1 to 200 parts by weight based on 100 parts by weight of the curable composition.

A material of the scaly or granular substance is not particularly limited to, and examples thereof include natural materials such as silica sand and mica, synthetic rubber, synthetic resin, and inorganic materials such as alumina. They may be appropriately colored in accordance with the material, the pattern or the like of the outer walls in order that when they are filled into the joints or the like, the design is made better.

A preferred finishing method therefor, and the like are disclosed in JP-A-09-53063 and the like.

The scaly or granular substance may be incorporated into the curable composition in advance, or the substance may be incorporated into the curable composition when it is used.

For a similar purpose, balloons (preferably, those having an average particle diameter of 0.1 mm or more) may also be added to a curable composition. The resultant cured product can have a sandy surface in a sand-scattered tone or in a sandstone tone and can be made light. The balloon is filler in the form of a sphere having a hollow inside.

The balloons are not particularly limited to, and include, for example, substances disclosed in JP-A-10-251618, JP-A-02-129262, JP-A-04-8788, JP-A-04-173867, JP-A-05-1225, JP-A-07-113073, JP-A-09-53063, JP-A-2000-154368, JP-A-2001-164237, WO 97/05201 and the like.

Examples of the materials of the balloons include inorganic materials such as glass, volcanic soil, silica and the like; and organic materials such as phenol resin, urea resin, polystyrene, saran and the like. In addition, composite materials made of an inorganic material and an organic material; and laminated materials composed of a plurality of layers are included. They may be used alone, or may be added in combination of a plurality of kinds.

The balloons may be those having coated surfaces, and those treated with various surface-treating agents. Specific examples thereof include a product wherein organic balloons are coated with calcium carbonate, talc, titanium oxide or the like, and a product wherein inorganic balloons are subjected to surface-treatment with an adhesion-imparting agent.

The particle diameter of the balloons is preferably 0.1 mm or more, more preferably from 0.2 to 5.0 mm, and particularly preferably from 0.5 to 5.0 mm. If the particle diameter is less than 0.1 mm, only the viscosity of the composition increases but the resultant cured product may not exhibit a sandy impression even if the balloons are added in a large amount.

When the balloons are added, the addition amount thereof may be appropriately selected in accordance with a design of interest. The balloons which have a particle diameter of 0.1 mm or more are added to the curable composition so as to give preferably a volume concentration of 5 to 25% by volume, and more preferably a volume concentration of 8 to 22% by volume. If the volume concentration of the balloons is less than 5% by volume, the sandy impression tends to be lost. If it is more than 25% by volume, the viscosity of the curable composition becomes high so that the workability tends to deteriorate. Additionally, the modulus of the resultant cured product also becomes high so that basic performances for a sealant or an adhesive tend to be damaged.

When the balloons are added, a slip inhibitor as disclosed in JP-A-2000-154368; an amine compound for giving irregularities to the surface of the resultant cured product to make the surface mat, as disclosed in JP-A-2001-164237; or the like can be added in combination. The amine compound is preferably a primary amine and/or a secondary amine which has/have a melting point of 35° C. or higher.

The balloons may also be thermally-expansive hollow fine particles as disclosed in JP-A-2004-51701, JP-A-2004-66749, or the like. The thermally-expansive hollow fine particles are plastic spheres wherein a low boiling point compound, such as a hydrocarbon having 1 to 5 carbon atoms, is encapsulated into a spherical form with a polymeric shell material (vinylidene chloride based copolymer, acrylonitrile based copolymer, or vinylidene chloride-acrylonitrile copolymer).

When the thermally-expansive hollow fine particles are added to the curable composition of the present invention, an adhesive composition, which can be peeled from an adherend without breaking the adherend only by heating the composition when the composition becomes unnecessary and which can be further peeled by heating using no organic solvent, can be obtained. This is based on a mechanism that when portions of the adhesive are heated, a gas pressure inside the shells of the thermally-expansive hollow fine particles increases so that the polymeric shell material softens, thereby expanding dramatically to cause the adhesive surfaces to be peeled from each other.

When the curable composition of the present invention contains sealant cured particles, irregularities are formed on the surface of the resultant cured product, as well, and as a result, the design of the product can be made better. Preferred diameter, blend amount, material and the like of the sealant cured particles are disclosed in JP-A-2001-115142. The diameter is preferably from 0.1 to 1 mm, and more preferably from 0.2 to 0.5 mm. The blend amount is preferably from 5 to 100 parts by weighs, and more preferably from 20 to 50 parts by weight based on 100 parts by weight of the curable composition. The material is not particularly limited to as far as the material is used as a sealant. Examples thereof include such as an urethane resin, silicone, modified silicone, and polysulfide rubber. Among them, preferred are modified silicone based sealant cured particles.

A silicate may be optionally added to the curable composition of the present invention. The silicate is a substance which acts, as a crosslinking agent, onto the polymer that is the component (A), and has a function of improving the restorability, the durability and the creep resistance of the resultant cured product.

Moreover, the addition of the silicate causes an improvement of the adhesiveness, the waterproof adhesiveness and the adhesion durability under high temperature and high humidity of the resultant cured product.

A silicate is not particularly limited to, but includes tetraalcoxysilane or partially hydrolyzed condensation products thereof. Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-1-propoxysilane, tetra-n-butoxysilane, tetra-1-butoxysilane, tetra-t-butoxysilane and the like; and partially hydrolyzed condensation products thereof.

In the case of using the silicate, the use amount thereof is preferably from 0.1 to 20 parts by weight, more preferably from 0.5 to 10 parts by weight for 100 parts by weight of the polymer(s) of the component (A).

The partially hydrolyzed condensate of tetraalkoxysilane is not particularly limited to, and includes, for example, a product obtained by adding water to tetraalkoxysilane, hydrolyzing the silane partially, and condensing the resultant.

The addition of the partially hydrolyzed condensate of tetraalkoxysilane is preferred since the restorability, the durability and the creep resistance of the resultant cured product are improved larger than those of the curable composition to which tetraalkoxysilane is added.

As the partially hydrolyzed condensate of tetraalkoxysilane, for example, METHYL SILICATE 51 and ETHYL SILICATE 40 (each of which is manufactured by Colcoat Co., Ltd.) are commercially available. They may each be used as an additive.

In order to prevent a change on the surface curability of the curable composition by the storage, it is preferred to select, as a silicate, a compound wherein a hydrolyzable group bonded to a silicon atom is equivalent to the hydrolyzable group in the reactive silicon group present in the polymer that is the component (A). In other words, when the polymer that is the component (A) has a methoxysilyl group, it is preferred to select a silicate having a methoxysilyl group; and when the polymer that is the component (A) has an ethoxysilyl group, it is preferred to select a silicate having an ethoxysilyl group.

A plasticizer can be added to the composition of the present invention if necessary. The addition of the plasticizer makes it possible to adjust the viscosity and the slump property of the curable composition, and the tensile strength, the elongation and other mechanical properties of the cured product obtained by curing the composition.

Examples of the plasticizer include, but are not particularly limited to, phthalic acid esters such as dibutyl phthalate, diheptyl phthalate, bis(2-ethylhexyl) phthalate, butylbenzyl phthalate and the like; non-aromatic dibasic acid esters such as dioctyl adipate, dioctyl sebacate, dibutyl sebacate, isodecyl succinate and the like; aliphatic esters such as butyl oleate, methyl acetylricinolate and the like; phosphates such as tricresyl phosphate, tributyl phosphate and the like; trimellitic acid esters; chlorinated paraffins; hydrocarbon oils such as alkyldiphenyl, partially-hydrogenated terphenyl and the like; process oils; epoxy plasticizers such as epoxidized soybean oil, benzyl epoxystearate and the like.

It is preferred to add a polymeric plasticizer, which contains a polymeric component in its molecule, for the reasons that the initial property of the resultant cured product can be maintained over a long term; when an alkyd paint is applied to the resultant cured product, the dryability (also referred to the paintability) can be improved; and the like.

Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, pentaerythritol esters and the like; polyester plasticizers each made from a dibasic acid such as sebacic acid, adipic acid, azelaic acid, phthalic acid or the like, and a dihydric alcohol such as ethylene glycol, diethylene glycol, triethylene glycol, propylene glycol, dipropylene glycol or the like; polyethers, for example, polyetherpolyols such as polyethylene glycol, polypropylene glycol polytetraethylene glycol or the like, which has a molecular weight of 500 or more, preferably 1,000 or more, and derivatives obtained by changing hydroxyl groups of these polyetherpolyols to ester groups, ether groups, or the like, and the like; polystyrenes such as polystyrene, and poly-α-methylstyrene, and the like; and polybutadiene, polybutene, polyisobutylene, butadiene-acrylonitrile, and polychloroprene and the like. However, the polymeric plasticizer is not: limited thereto.

Of these polymeric plasticizers, preferred are plasticizers high in compatibility with the polymer that is the component (A). Examples thereof include e polyethers and vinyl based polymers.

Polyethers are more preferred since the surface curability and the depth curability of the curable composition are good and no curing delay is caused after the composition is stored. Specifically, polypropylene glycol is particularly preferred.

Furthermore, vinyl based polymers are preferred since the polymers are high in compatibility with the polymer that is the component (A) and the weather resistance and the heat resistance of the resultant cured product are good. Among the polymers, more preferred are acrylic based polymers and/or methacrylic based polymers, and particularly preferred are acrylic based polymers such as alkyl polyacrylate esters.

A method for producing alkyl polyacrylate esters is not particularly limited to, and living radical polymerization is preferred since a narrow molecular weight distribution and low viscosity can be gained. Atom transfer radical polymerization is more preferred. Particularly preferred is a method of subjecting an alkyl polyacrylate ester based compound to continuous bulk polymerization under high temperature and high pressure, the method being referred to the SGO process and disclosed in JP-A-2001-207157 and the like.

The number-average molecular weight of the polymeric plasticizer is preferably from 500 to 15,000, from 800 to 10,000, more preferably from 1,000 to 8,000, even more preferably from 1,000 to 5,000. The molecular weight is most preferably from 1,000 to 3,000. If the molecular weight of the polymeric plasticizer is too low, the plasticizer flows out from the resultant cured product with time by heat or rainfall so that the initial physical properties cannot be maintained over a long term, the plasticizer causes pollution based on adhesion of dust thereto, and the alkyd paintability tends to be inferior. If the molecular weight is too high, the viscosity of the curable composition becomes high so that the workability deteriorates.

The molecular weight distribution of the polymeric plasticizer is not particularly limited, and a narrow distribution is preferred. The distribution is preferably less than 1.80, 1.70 or less, more preferably 1.60 or less, even more preferably 1.50 or less, in particular preferably 1.40 or less, most preferably 1.30 or less.

In the case that the plasticizer is a polyether polymer, the number-average molecular weight is measured by terminal group analysis. In the case that the plasticizer is any other polymer, the number-average molecular weight is measured by a GPC method. The molecular weight distribution (Mw/Mn) is measured by the GPC method (in terms of polystyrene).

The polymeric plasticizer may or may not have a reactive silicon group in its molecule. In the case of adding the polymeric plasticizer which has a reactive silicon group, the polymeric plasticizer is taken in the curing reaction so that the plasticizer can be prevented from being bleeded from the resultant cured product, and thus, the case is preferred.

The polymeric plasticizer which has a reactive silicon group is preferably a compound having a reactive silicon group in a number of one or less on average per molecule of the compound, and is more preferably a compound having a reactive silicon group in a number of 0.8 or less. In the case of adding the plasticizer which has a reactive silicon group, in particular, an oxyalkylene polymer having a reactive silicon group, the number-average molecular weight thereof is preferably lower than that of the polymer that is the component (A) in order to gain a sufficient plasticizing effect.

About the plasticizer, only one kind may be added, or a plurality of kinds may be added in combination. In addition, a low molecular weight plasticizer and a polymeric plasticizer may be used added in combination. These plasticizers may be blended when the polymer that is the component (A) is produced.

In the addition of the plasticizer, the addition amount thereof is preferably from 5 to 150 parts by weight, more preferably from 10 to 120 parts by weight, and particularly preferably from 20 to 100 parts by weight based on 100 parts by weight of the polymer that is the component (A). If the addition amount is less than 5 parts by weight, the effect of the plasticizer tends not to be expressed. If the amount is more than 150 parts by weight, the mechanical strength of the cured product tends to be insufficient.

A tackifier may be added to the composition of the present invention if necessary. The adhesion-imparting agent of resin (tackifying resin) is not particularly limited, and may be a resin that is usually used whether the resin is in a solid form or in a liquid form at normal temperature. Specific examples thereof include styrene based block copolymer, a hydrogenated product thereof, phenol resin, modified phenol resins (such as cashew oil modified phenol resin, tall oil modified phenol resin and the like), terpene-phenol resin, xylene-phenol resin, cyclopentadiene-phenol resin, coumalin-indene resin, rosin resin, rosin ester resin, hydrogenated rosin ester resin, xylene resin, low molecular weight polystyrene resin, styrene copolymer resin, petroleum resins (such as C5 hydrocarbon resin, C9 hydrocarbon resin, C5C9 hydrocarbon copolymer resin and the like), hydrogenated petroleum resins, terpene resin, and DCPD resin petroleum resin and the like. These may be used alone or in combination of two or more thereof.

Examples of the styrene block copolymer and the hydrogenated product thereof include, but are not particularly limited to, styrene-butadiene-styrene block copolymer (SS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene copolymer (SIBS) and the like.

When the tackifier is added, the addition amount thereof is preferably from 5 to 1,000 parts by weight, and more preferably from 10 to 100 parts by weight based on 100 parts by weight of the polymer that is the component (A).

A solvent or a diluting agent may be optionally added into the curable composition of the present invention. The solvent and the diluting agent are not particularly limited to, and examples thereof include such as aliphatic hydrocarbons, aromatic hydrocarbons, alicyclic hydrocarbons, halogenated hydrocarbons, alcohols, esters, ketones, ethers and the like. They may be added alone or may be added in combination of a plurality of kinds.

In the case of adding the solvent or the diluting agent, the boiling point of the solvent or the diluting agent is preferably 150° C. or higher, and more preferably 200° C. or higher in order to prevent volatile components from diffusing into the air when the curable composition is used indoors.

A physical property adjuster may be optionally added into the curable composition of the present invention. The physical property adjuster is an agent having a function of adjusting the tensile property and the hardness of the resultant cured product.

The physical property adjustor is not particularly limited, and examples thereof include alkylalkoxysilanes such as methyltrimethoxysilane, dimethyldimethoxysilane, trimethylmethoxysilane, n-propyltrimethoxysilane and the like; alkylisopropenoxysilanes such as dimethyldiisopropenoxysilane, methyltriisopropenoxysilane, γ-glycidoxypropylmethyldiisopropenoxysilane and the like; alkoxysilanes having a functional group, such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropylmethyldimethoxysilane and the like; silicone vanish; polysiloxanes and the like. These may be used alone or in combination of two or more thereof.

Among the physical property adjusters, preferred are those which are hydrolyzed to produce a compound having a monovalent silanol group in its molecule, since the adjusters have an effect of lowering the modulus of the resultant cured product without deteriorating the tack of the surface thereof. Among these compounds, more preferred are compounds which are hydrolyzed to produce trimethylsilanol.

The compounds which are hydrolyzed to produce a compound having a monovalent silanol group in its molecule are not particularly limited to. Examples thereof include compounds disclosed in JP-A-05-117521; compounds that are derivatives of an alkylalcohol such as hexanol, octanol, decanol and the like, and are hydrolyzed to produce an organic silicon compound represented by $R_3SiOH$ such as trimethylsilanol and the like; and compounds that are derivatives of a polyhydric alcohol having 3 or more hydroxyl groups in its molecule, such as trimethylolpropane, glycerin, pentaerythritol, sorbitol and the like, and are hydrolyzed to produce an organic silicon compound represented by $R_3SiOH$ such as trimethylsilanol and the like, the compounds being disclosed in JP-A-11-241029, or the like.

Furthermore, examples thereof include compounds that are derivatives of an oxypropylene polymer and are hydrolyzed to produce an organic silicon compound represented by $R_3SiOH$ such as trimethylsilanol and the like, the compounds being disclosed in JP-A-07-258534; and compounds having a group having hydrolyzable silicon that can be crosslinked and a silicon group capable of being hydrolyzed to produce a compound having a monovalent silanol group, the compound being disclosed in JP-A-06-279693.

When the physical property adjuster is added, the addition amount thereof is preferably from 0.1 to 20 parts by weight, and more preferably from 0.5 to 10 parts by weight based on 100 parts by weight of the polymer that is the component (A)

A thixotropic agent (anti-sagging agent) may be optionally added into the curable composition of the present invention. The thixotropic agent is an agent having a function of preventing the curable composition from sagging to make the workability good.

The thixotropic agent is not particularly limited to, and examples thereof include such as polyamide waxes; hydrogenated castor oil derivatives; and metal soaps, such as calcium stearate, aluminum stearate, barium stearate and the like. Furthermore, examples thereof include a rubber powder, having a particle diameter of 10 to 500 μm, disclosed in JP-A-11-349916 and others; and organic fibers disclosed in JP-A-2003-155389 and the like. These thixotropic agents (anti-sagging agents) may be added alone or in combination of a plurality of kinds.

When the thixotropic agent is added, the addition amount thereof is preferably from 0.1 to 20 parts by weight based on 100 parts by weight of the polymer that is the component (A).

A compound having an epoxy group in its molecule may be optionally added into the curable composition of the present invention. The addition of the compound having an epoxy group makes it possible to heighten the restorability of the resultant cured product.

The compound having an epoxy group is not particularly limited to, and examples thereof include compounds such as epoxidized unsaturated oils and fats; epoxidized unsaturated aliphatic acid esters; alicyclic epoxy compounds; epichlorohydrin derivatives and the like; and mixtures thereof and the like. More specific examples thereof include such as epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among these compounds, E-PS is preferred.

When the epoxy compound is added, the addition amount thereof is preferably from 0.5 to 50 parts by weight based on 100 parts by weight of the polymer that is the component (A)

An optically curable material may be optionally added into the curable composition of the present invention. The optically curable material is a material which receives an effect of light to cause a chemical change in its molecular structure in short time, thereby generating a physical change, such as curing. When the optically curable material is added into the curable composition, a coating of the optically curable material is formed on the surface of the resultant cured product so that the tack or the weather resistance of the cured product is improved.

The optically curable material is not particularly limited to, and includes a known optically curable material, such as an organic monomer, an oligomer, a resin, a composition containing thereof and the like. Examples thereof include such as unsaturated acrylic based compounds, polyvinyl cinnamates, azido resins and the like.

Examples of the unsaturated acrylic based compounds include monomers and oligomers having one or a plurality of acrylic based or methacrylic based unsaturated groups in its molecule; and mixtures thereof. Specific examples thereof include a monomer such as propylene (or butylene or ethylene), glycol di(meth)acrylate and neopentyl glycol di(meth)acrylate, and oligo esters having a molecular weight of 10,000 or less. More specific examples thereof include ARONIX M-210, ARONIX M-215, ARONIX M-220, ARONIX M-233, ARONIX M-240, and ARONIX M-245, which are special (bifunctional) acrylates; (trifunctional) ARONIX M-305, ARONIX M-309, ARONIX M-310, ARONIX M-315, ARONIX M-320, and ARONIX M-325; and (polyfunctional) ARONIX M-400 (ARONIXs are each manufactured by Toagosei Co., Ltd.)m and the like. Among these examples, preferred are compounds having an acrylic functional group, and more preferred are compounds having 3 or more acrylic functional groups on average in its molecule.

The polyvinyl cinnamate is a photosensitive resin having a cinnamoyl group as a photosensitive group, and examples thereof include a compound wherein polyvinyl alcohol is esterified with cinnamic acid; and a great number of other polyvinyl cinnamate derivatives.

The azido resins are known as photosensitive resins having an azide group as a photosensitive group. An ordinary example thereof is a resin obtained by adding a diazide compound as a photosensitizer to a rubber photosensitive liquid. Besides, the azido resins are exemplified in detail in "Photosensitive Resin (published in Mar. 17, 1972, published by Insatsu Gakkai Shuppanbu Ltd., p. 93 and pages subsequent thereto, p. 106 and pages subsequent thereto, and p. 117 and pages subsequent thereto)". They may be used alone or in a mixture form, or may be used together with a sensitizer, if necessary.

When a sensitizer, such as ketones, a nitro compound and the like, or a promoter such as amines and the like, is added, there may be a case where the effect may be increased.

When the optically curable material is added, the addition amount thereof is preferably from 0.1 to 20 parts by weight, and more preferably from 0.5 to 10 parts by weight based on 100 parts by weight of the polymer that is the component (A). If the amount is 0.1 parts or less by weight, the effect of heightening the weather resistance of the resultant cured product is hardly produced. If the amount is 20 parts or more by weight, the resultant cured product becomes too hard so that the product tends to be cracked.

An oxygen curable material may be added into the curable composition of the present invention if necessary. The oxygen curable material is a material which reacts with oxygen in the air so as to be cured. By the addition of the oxygen curable material, a cured coating is formed in the vicinity of the surface of the resultant cured product so that the tack of the cured product surface or adhesion of dirt or dust thereto can be prevented.

The oxygen curable material is not particularly limited to as far as it is a compound having an unsaturated compound reactive with oxygen in the air. Examples thereof include drying oils such as tung oil, linseed oil and the like, various alkyd resins obtained by modifying the compounds; acrylic based polymers, epoxy based resins, and silicone based resins modified with a drying oil; liquid polymers such as polymers of 1,2-polybutadiene, 1,4-polybutadiene, $C_5$-$C_8$ dienes and the like, which are obtained by polymerizing or copolymerizing diene based compounds, such as butadiene, chloroprene, isoprene, 1,3-pentadiene and the like; liquid copolymers such as NBR, SBR and the like, which are obtained by copolymerizing diene based compounds with a vinyl based compound that is copolymerizable, such as acrylonitrile, styrene and the like, so as to render the diene based compound a main component; and further various modified products thereof (such as maleinate-modified products, boiled oil modified products and the like) and the like. Of these examples, tung oil and liquid diene based polymers are preferred. As for the oxygen curable material, one kind thereof may be added, or a plurality of kinds may be added in combination.

About the oxygen curable material, there may be a case where the effect may be increased by mixing with or adding to a catalyst for promoting the curing reaction, or a metallic drier. The catalyst for promoting the curing reaction, or the metallic drier is not particularly limited to, and examples thereof include metal salts such as cobalt naphthenate, lead naphthenate, zirconium naphthenate, cobalt octanoate, zirconium octanoate and the like, amine compounds and the like.

When the oxygen curable material is added, the addition amount thereof is preferably from 0.1 to 20 parts by weight, and more preferably from 0.5 to 10 parts by weight based on 100 parts by weight of the polymer that is the component (A). If the addition amount is less than 0.1 parts by weight, the effect that the stain resistance of the resultant cured product is improved tends to become insufficient. If the amount is more than 20 parts by weight, the tensile property and the like of the resultant cured product tend to be damaged.

It is preferred that the oxygen curable material is mixed with or is added to an optically curable material, as disclosed in JP-A-03-160053.

An antioxidant may be optionally added into the curable composition of the present invention. The addition of the antioxidant makes it possible to improve the heat resistance of the resultant cured product.

The antioxidant is not particularly limited to, and examples thereof include hindered phenol based, monophenol based, bisphenol based, and polyphenol based antioxidants. Of these antioxidants, preferred are hindered phenol based antioxidants. Preferred are also hindered amine based light stabilizers, such as TINUVIN 622LD, TINUVIN 144, CHIMASSORB 944LD, and CHIMASSORB 119FL (each of which is manufactured by Ciba Specialty Chemicals K.K. JPN); ADEKASTAB LA-57, ADEKASTAB LA-62, ADEKASTAB LA-67, ADEKASTAB LA-63, and ADEKASTAB LA-68 (each of which is manufactured by ADEKA Corporation); SANOL LS-770, SANOL LS-765, SANOL LS-292, SANOL LS-2626, SANOL LS-1114, and SANOL LS-744 (each of which is manufactured by Sankyo LifeTech Co., Ltd.), and the like. Specific examples of the antioxidant are also disclosed in JP-A-04-283259 and JP-A-09-194731.

When the antioxidant is added, the addition amount thereof is preferably from 0.1 to 10 parts by weight, and more preferably from 0.2 to 5 parts by weight based on 100 parts by weight of the polymer that is the component (A).

A light stabilizer may be optionally added into the curable composition of the present invention. The addition of the light stabilizer makes it possible to prevent the resultant cured product from being deteriorated due to photo oxidization.

The light stabilizer is not particularly limited to, and examples thereof include benzotriazole based compounds, hindered amine based compounds, benzoate based compounds and the like. Among these compounds, preferred are hindered amine based compounds.

When the light stabilizer is added, the addition amount thereof is preferably from 0.1 to 10 parts by weight, and more preferably from 0.2 to 5 parts by weight based on 100 parts by weight of the polymer that is the component (A). Specific examples thereof are also disclosed in JP-A-09-194731.

When an optically curable material such as an unsaturated acrylic based compound is added into the curable composition of the present invention, it is preferred to add a hindered amine based light stabilizer having a tertiary amine group, as disclosed in JP-A-05-70531, since the storage stability of the curable composition is improved.

The hindered amine based light stabilizer having a tertiary amine group is not particularly limited to, and examples thereof include TINUVIN 622LD, TINUVIN 144, and CHIMASSORB 119FL (each of which is manufactured by Ciba Specialty Chemicals K.K. JPN); ADEKASTABLA-57, ADEKASTABLA-62, ADEKASTAB LA-67, and ADEKASTAB LA-63 (each of which is manufactured by ADEKA Corporatin); SANOLs LS-765, LS-292, LS-2626, LS-1114, and LS-744 (each of which is manufactured by Sankyo LifeTech Co., Ltd.) and the like.

An ultraviolet absorbent may be optionally added into the curable composition of the present invention. The addition of the ultraviolet absorbent causes an improvement in the surface weather resistance of the resultant cured product.

The ultraviolet absorbent is not particularly limited to, and examples thereof include benzophenone based, benzotriazole based, salicylate based, substituted tolyl based, metal chelate based compounds and the like.

Among them, benzotriazole based ultraviolet absorbents are particularly preferred.

When the ultraviolet absorbent is added, the addition amount thereof is preferably from 0.1 to 10 parts by weight, and more preferably from 0.2 to 5 parts by weight based on 100 parts by weight of the polymer that is the component (A).

It is preferred to add the antioxidant, the light stabilizer, and the ultraviolet absorbent in combination into the curable composition. It is preferred that, for example, a phenol based or hindered phenol based antioxidant, a hindered amine based light stabilizer, and a benzotriazole based ultraviolet absorbent are mixed to add.

An epoxy resin may be optionally added into the curable composition of the present invention. According to the addition of the epoxy resin, the adhesiveness of the resultant cured product is improved. The curable composition into which the epoxy resin is added is used preferably as an adhesive, in particular, an adhesive for outer wall tiles.

The epoxy resin is not particularly limited to, and examples thereof include epichlorohydrin-bisphenol A type epoxy resins, epichlorohydrin-bisphenol F type epoxy resins, flame retardant epoxy resins such as glycidyl ether of tetrabromobisphenol A, Novolak type epoxy resins, hydrogenated bisphenol A type epoxy resins, glycidyl ether type epoxy resins of an adduct of bisphenol A propylene oxide, p-oxybenzoic acid glycidyl ether ester type epoxy resins, m-aminophenol epoxy resins, diaminodiphenylmethane based epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ether of a polyhydric alcohol such as glycerin, hydantoin type epoxy resins, epoxidized products of an unsaturated polymer such as petroleum resins, and the like. Among these examples, preferred are epoxy resins having at least two or more epoxy groups in its molecule, and more preferred are bisphenol A type epoxy resins and Novolak type epoxy resins and the like, since they make the reactivity of the curable composition high, the resultant cured product easily forms a three-dimensional network structure, and the like.

The addition amount of the epoxy resin is varied in accordance with the use application of the curable composition, and the like. For example, in the case of improving such as the impact resistance, the flexibility, the toughness and the peeling strength and the like of the epoxy resin cured product, the polymer that is the component (A) is added preferably in an amount of 1 to 100 parts by weight, and more preferably in an amount of 5 to 100 parts by weight based on 100 parts by weight of the epoxy resin. On the other hand, in the case of improving the strength of the cured product of the polymer that is the component (A), the epoxy resin is added preferably in an amount of 1 to 200 parts by weight, and more preferably in an amount of 5 to 100 parts by weight based on 100 parts by weight of the polymer.

When the epoxy resin is added into the curable composition of the present invention, it is preferred to add a curing agent for epoxy resin in combination.

The epoxy resin curing agent is not particularly limited as far as the agent has a function to cure the epoxy resin, and may be any epoxy resin curing agent that is ordinarily used. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyether and the like; tertiary amines such as 2,4,6-tris(dimethylaminomethyl)phenol and tripropylamine, and salts of these tertiary amines; polyamide resins; imidazoles; dicyandiamines; trifluoroboron complex compounds; carboxylic anhydrides such as phthalic anhydride, hexahydrophthalic anhydride, tetrahydrophthalic anhydride, dodecylsuccinicanhydride, pyromelliticanhydride, chlorendic anhydride and the like; alcohols; phenols; carboxylic acids; and diketone complex compounds of aluminum or zirconium, and the like. These may be added alone or in combination of two or more thereof.

When the epoxy resin curing agent is added, the addition amount thereof is preferably from 0.1 to 300 parts by weight based on 100 parts by weight of the epoxy resin.

It is preferred to use, out of the epoxy resin curing agents, a ketimine compound since a one-part-type curable composition can be obtained. The ketimine compound has a nature that the compound exists stably in the absence of water; and the compound is decomposed to a primary amine and a ketone by water, and the resultant primary amine becomes a curing agent for curing an epoxy resin at room temperature. The ketimine compound includes a compound obtained by condensing reaction between an amine compound and a carbonyl compound.

An amine compound and a carbonyl compound to be used for synthesizing the ketimine are not particularly limited to, and a known compound can be exemplified. As the amine compound, the following is used: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, p,p'-biphenylenediamine and the like; a polyhydric amine such as 1,2,3-triaminopropane, triaminobenzene, tris(2-aminoethyl)amine, tetrakis (aminomethyl)methane and the like; a polyalkylenepolyamine such as diethylenetriamine, triethylenetriamine, tetraethylenepentamine and the like; a polyoxyalkylene polyamine; an aminosilane such as γ-aminopropyltriethoxysilane, N-(β-aminoethyl)-γ-aminopropyltrimethoxysilane, N-(β-aminoethyl)-γ-aminopropylmethyldimethoxysilane and the like; and the like.

As the carbonyl compound, the following can be used: an aldehyde such as acetoaldehyde, propionaldehyde, n-butylaldehyde, isobutylaldehyde, diethylacetoaldehyde, glyoxal, benzaldehyde or the like; a cyclic ketone such as cyclopentanone, trimethylcyclopentanone, cyclohexanone, trimethylcyclohexanone or the like; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone or the like; a β-dicarbonyl compound such as acetylacetone, methyl acetoacetate, ethyl acetoacetate, dimethyl malonate, diethyl malonate, methylethyl malonate, dibenzoylmethane or the like; or the like.

A ketimine compound having an imino group includes a compound synthesized by reacting an imino group with styrene oxide, a glycidyl ether such as butyl glycidyl ether allyl glycidyl ether or the like, a glycidyl ester, or the like.

These ketimines may be added alone or in combination of two or more thereof.

When a ketimine compound is added, the use amount thereof is preferably from 1 to 100 parts by weight for 100 parts by weight of the epoxy resin, and is varied in accordance with the kind of the epoxy resin and that of the ketimine.

If necessary, a flame retardant may be added to the curable composition of the present invention. A flame retardant is not particularly limited to, and includes a phosphorus-containing plasticizer such as ammonium polyphosphate, tricresyl phosphateor, and the like; aluminum hydroxide, magnesium hydroxide, thermally expandable graphite and the like. These flame retardants may be used alone or in combination of two or more thereof.

When the flame retardant is added, the addition amount thereof is preferably from 5 to 200 parts by weight, and more preferably from 10 to 100 parts by weight based on 100 parts by weight of the polymer that is the component (A).

Various additives other than the above agents may be optionally added into the curable composition of the present invention to adjust various physical properties of the curable composition or the resultant cured product. Examples of the additives include such as a curability adjuster, a radical inhibitor, a metal inactivating agent, an antiozonant, phosphorus-based peroxide decomposing agent, a lubricant, a pigment, a foaming agent, a termiticide, an antifungal agent and the like. Specific examples thereof are disclosed in publications such as JP-B-04-69659, JP-B-07-108928, JP-A-63-254149, JP-A-64-22904, JP-A-2001-72854 and the like. These additives may be added alone or in combination of a plurality of kinds.

As a method for preparing the curable composition of the present invention, any one of one-part-type preparation and two-part-type preparation may be adopted. One-part-type preparation is preferred since the workability is good. The one-part-type preparation is a preparation in which all blending components are blended with each other in advance, and then the resultant blend is air-tightly stored, and the blend is cured with moisture in the air after applying to a spot. The two-liquid type preparation is a preparation in which components such as a curing catalyst, a filler, a plasticizer, water and the like are blended with each other, as a blending agent for curing, separately and then the blending agent for curing and a polymer composition are mixed with each other before applying to a spot.

In a case where the curable composition is of a one-part-type, all blending components are blended in advance; thus, if water is present in the blend, the curing may proceed during being stored. Accordingly, it is preferred to dehydrate the blending components containing water in advance and subsequently add them to the components, or dehydrate the components by a reduced pressure or the like while the components are blended and kneaded.

In a case where the curable composition is of a two-part-type, it is unnecessary to incorporate a curing catalyst into a main part containing the polymer having a reactive silicon group; thus, even if some amount of water is contained in the blend, it is hardly feared that the curing (gelatinization) proceeds. However, when the blend is required to have storage stability over a long term, it is preferred to dehydrate the blend.

When the blend is in the form of a solid such as a powder, the method for the dehydrating and drying is preferably drying by heating, or pressure-reducing dehydration. When the blend is in the form of a liquid, the method is preferably pressure-reducing dehydration, or dehydration using synthetic zeolite activating alumina, silica gel, caustic lime, magnesium oxide, or the like. Preferred is also dehydration performed by adding an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, γ-glycidoxypropyltrimethoxysilane and the like; an oxazolidine compound such as 3-ethyl-2-methyl-2-(3-methylbutyl)-1,3-oxazolidine; or an isocyanate compound into the curable composition so as to cause the compound to react with water contained in the blend. By adding an alkoxysilane compound, an oxazolidine compound and an isocyanate compound in such a way, the storage stability of the curable composition is improved.

When an alkoxysilane compound reactive with water, such as vinyltrimethoxysilane, is used for drying, the addition thereof is preferably from 0.1 to 20 parts by weight, and more preferably from 0.5 to 10 parts by weight based on 100 parts by weight of the polymer that is the component (A).

The method for preparing the curable composition of the present invention is not particularly limited to, and a known method may be adopted, examples of which include such as a method of preparing the above blending components, and then kneading the components under room temperature or heating by use of a mixer, a roll, a kneader or the like, or a method of using a small amount of an appropriate solvent to dissolve the blending components, and then mixing the components.

When the curable composition of the present invention is exposed to the atmosphere, a three-dimensional network structure is formed therein by effect of water, so that the composition is cured into a solid having rubbery elasticity.

The curable composition of the present invention is used preferably as a tackifier; a sealant for buildings, ships and boats, automobiles, roads and the like; an adhesive; a mold-making agent; a vibration proof material; a damping material; a soundproof material; a foaming material; a paint; a spraying material; or the like. Among them, the curable composition is used more preferably as a sealant or an adhesive, since the resultant cured product is excellent in flexibility and adhesiveness.

Moreover, the curable composition of the present invention may be used as various applications, for example, an electric/electronic part material, such as a solar cell rear face sealant; an electrically insulating material, such as an insulating coating material for electric wires/cables; an elastic adhesive; a contact-type adhesive; a spray type sealant; a crack repairing material; tiling adhesives; a powdery paint; a casting material; a rubber material for medical use; an adhesive for medical use; a sealant for medical device; a food wrapping material; a jointing sealant for exterior members such as a siding board; a coating material; a primer; an electroconductive material for shielding electromagnetic waves; a thermally conductive material; a hot melt material; an electrical or electronic potting material; a film; a gasket; various molding materials; a rust-preventive or waterproofing sealant for end faces (cut regions) of net-reinforced glass or laminated glass; and a liquid sealing agent used in such as car components, electric components, various mechanical components and the like, and the like.

Furthermore, the curable composition can be adhered closely to wide range of substrates such as glass, ceramics, woods, metals, resin-molded products and the like by itself or by aid of a primer. Accordingly, the curable composition may also be used as air-tightly sealing compositions and adhesive compositions of various types.

The curable composition of the present invention may also be used as an adhesive for interior panels, an adhesive for exterior panels, an adhesive for laying tiles, an adhesive for laying building stones, an adhesive for finishing ceilings, an adhesive for finishing floors, an adhesive for finishing walls, an adhesive for vehicle panels, an adhesive for assembling an electrical, electronic or precision instrument, a sealant for direct grading, a sealant for laminated glass, a sealant for the SSG method, or a sealant for working joints of buildings.

EXAMPLES

The present invention will be described by way of the following examples and comparative examples; however, the present invention is not limited thereto.

Synthesis Example 1

Polyoxypropylene diol having a molecular weight of about 2,000 was used as an initiator to polymerize propylene oxide in the presence of a zinc hexacyanocobaltate glyme complex catalyst to yield polypropylene oxide having hydroxyl groups at its terminals and having a number-average molecular weight of about 25,500 (molecular weight converted to that of polystyrene, which was measured using an HLC-8129GPC manufactured by Tosoh Corporation. as a liquid-sending system, a TSK-GEL H type column manufactured by Tosoh Corporation. as a column, and THF as a solvent). Subsequently, to this hydroxyl-group-terminated polypropylene oxide was added a solution of NaOMe in methanol in an equivalent 1.2 times that of the hydroxyl groups of the hydroxyl-group-terminated polypropylene oxide, and then methanol was distilled off. Furthermore, thereto was added allyl chloride to convert the hydroxyl groups at the terminals to allyl groups. Unreacted allyl chloride was removed by degassing under reduced pressure. Into 100 parts by weight of the resultant crude ally-group-terminated polypropylene oxide were incorporated 300 parts by weight of n-hexane, and 300 parts by weight of water, and then the resultant solution was stirred. Water was removed therefrom by centrifugal separation. Into the resultant solution in hexane were further incorporated 300 parts by weight of water, and the solution was stirred. Water was again removed therefrom by centrifugal separation, and then hexane was removed therefrom by degassing under reduced pressure. According to the above, allyl-group-terminated bifunctional polypropylene oxide (P-1) having a number-average molecular weight of about 25,500 was obtained.

To 100 parts by weight of the resultant allyl-group-terminated polypropylene oxide (P-1) was added 1.1 parts by weight of trimethoxysilane to cause the reaction, using a solution of a platinum vinylsiloxane complex in isopropyl alcohol containing 3% by weight of platinum, as a catalyst, in an amount of 150 ppm at 90° C. for 2 hours, so as to yield trimethoxysilyl-group-terminated polyoxypropylene based polymer (A-1). The polymer was measured by $^1$H-NMR (using a JNM-LA400 manufactured by JEOL Ltd. in a CDCl$_3$ solvent). According to the measurement, the number of the trimethoxysilyl groups at the terminals was about 1.3, on average, per molecule.

Synthesis Example 2

The same operations were conducted as in Synthesis Example 1 except that trimethoxysilane in Synthesis Example 1 was changed to dimethoxymethylsilane, the amount of which was 0.9 parts by weight, so as to yield dimethoxysilyl-group-terminated polyoxypropylene polymer (A-2). According to a measurement thereof by $^1$H-NMR, the number of the dimethoxymethylsilyl groups at the terminals was about 1.3, on average, per molecule.

Examples 1 to 5, and Comparative Examples 1 to 6

To the polymer (A-1 or A-2) weighed into a mini-cup was first added a fluorosilane (B) in accordance with each of formulations in Table 1, and the components were quickly kneaded with a spatula for 1 minute. Next, an amine based compound (C) was added thereto, and further the components were kneaded for 1 minute. After the kneading, the cup was allowed to stand still in a thermostat of 23° C. temperature and 50% humidity. This time was defined as the curing starting time. The tip of the spatula was brought into contact with the surface of the composition at intervals of one minute for 30 minutes at the initial stage, at intervals of 10 minutes until one hour elapse, and at intervals of one hour thereafter. The time until the composition came not to adhere onto the spatula was defined as a skin formation time. Thus, the curing time was measured. The results are shown Table 1.

TABLE 1

| Composition (part(s) by weight) | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| Polymer (A) | A-1 | 100 | 100 | 100 | 100 | | 100 | 100 | 100 | 100 | | 100 |
| | A-2 | | | | | 100 | | | | | 100 | |
| Fluorosilane (B) | Fluorodimethylvinyl silane | 0.5 | 0.5 | 0.5 | 0.5 | 0.5 | | | | | | 1 |
| Amine based compound (C) | DBU$^{(2)}$ | 1 | | | | 1 | 1 | | | | 1 | |
| | DEAPA$^{(3)}$ | | 2 | | | | | 2 | | | | |
| | o-Tolylbiguanide | | | 2 | | | | | 2 | | | |
| | A1110$^{(5)}$ | | | | 2 | | | | | 2 | | |
| Curability | Skin formation time | <1 minute | 16 minutes | 7 minutes | 20 minutes | 21 minutes | 40 minutes | >24 hours | 2 hours | >24 hours | >24 hours | >24 hours |

$^{(1)}$SIV 9073.0, manufactured by AZmax Co., Ltd.
$^{(2)}$1,8-Diazabicyclo[5.4.0]-7-undecene, manufactured by Wako Pure Chemical Industries, Ltd.
$^{(3)}$3-Diethylaminopropylamine, manufactured by Wako Pure Chemical Industries, Ltd.
$^{(4)}$Sigma-Aldrich Japan K.K.
$^{(5)}$3-Aminopropyltrimethoxysilane, manufactured by Nippon Unicar Co., Ltd.

In the systems wherein a fluorosilane (B) and an amine based compound (C) were used in combination as in the Examples, excellent curability was shown. On the other hand, in cases where only an amine based compound (C) was used as a curing catalyst as in Comparative Examples 1 to 5, or in a case where only a fluorosilane (B) was used as in Comparative Example 6, the curability was insufficient.

Synthesis Example 3

To 100 parts by weight of vinyl-terminated polydimethylsiloxane (DMSV42: manufactured by Gelest, Inc.) was added 0.66 parts by weight of a hydrosilane compound represented by the following chemical formula:

$$HSi(CH_3)_2OSi(CH_3)_2C_2H_4Si(OCH_3)_3,$$

so as to cause the reaction, using a solution of a platinum vinylsiloxane complex in isopropyl alcohol containing 3% by weight of platinum, as a catalyst, in an amount of 150 ppm at 90° C. for 2 hours, so as to yield trimethoxysilyl-group-terminated polydimethylsiloxane (A-3). According to a measurement by $^1$H-NMR, the number of the trimethoxysilyl groups at the terminals was about 1.2, on average, per molecule.

Example 6, and Comparative Examples 7 and 8

In accordance with each of formulations shown in Table 2, the polymer (A-3) was used to measure the curing time in a similar manner as described above. The results are shown Table 2.

TABLE 2

| Component (part(s) by weight) | | Example 6 | Comparative Example 7 | Comparative Example 8 |
|---|---|---|---|---|
| Polymer (A) | A-3 | 100 | 100 | 100 |
| Fluorosilane (B) | Fluorodimethylvinylsilane | 0.5 | 1 | |
| Amine based compound (C) | DBU | 2 | | 2 |
| Curability | Skin formation time | <1 minute | >4 hours | >4 hours |

About the polydimethylsiloxane based polymer (A-3), a remarkable curability-improving effect was obtained by the addition of a fluorosilane (B) and an amine compound (C).

Synthesis Example 4

Polyoxypropylene triol having a molecular weight of about 3,000 was used as an initiator to polymerize propylene oxide in the presence of a zinc hexacyanocobaltate glyme complex catalyst to yield polypropylene oxide having hydroxyl groups at its terminals and having a number-average molecular weight of about 26,000. Subsequently, to this hydroxyl-group-terminated polypropylene oxide was added a solution of NaOMe in methanol in an equivalent 1.2 times that of the hydroxyl groups of the hydroxyl-group-terminated polypropylene oxide, and then methanol was distilled off. Furthermore, thereto was added allyl chloride to convert the hydroxyl groups at the terminals to allyl groups. Unreacted allyl chloride was removed by degassing under reduced pressure. Into 100 parts by weight of the resultant crude ally-group-terminated polypropylene oxide were incorporated 300 parts by weight of n-hexane, and 300 parts by weight of water, and then the resultant solution was stirred. Water was then removed therefrom by centrifugal separation. Into the resultant solution in hexane were further incorporated 300 parts by weight of water, and the solution was stirred. Water was again removed therefrom by centrifugal separation, and then hexane was removed therefrom by degassing under reduced pressure. According to the above, allyl-group-terminated trifunctional polypropylene oxide (P-2) having a number-average molecular weight of about 26,000 was obtained.

To 100 parts by weight of the resultant allyl-group-terminated polypropylene oxide (P-2) were added 1.2 parts by weight of trimethoxysilane to cause the reaction, using a solution of a platinum vinylsiloxane complex in isopropyl alcohol containing 3% by weight of platinum, as a catalyst, in an amount of 150 ppm at 90° C. for 2 hours, so as to yield trimethoxysilyl-group-terminated polyoxypropylene based polymer (A-4). According to a measurement thereof by $^1$H-NMR, the number of the trimethoxysilyl groups at the terminals was about 1.8, on average, per molecule.

Example 7, and Comparative Example 9

In accordance with each of formulations shown in Table 3, the polymer (A-4) was mixed with a filler, and a thixotropic agent, so as to prepare a main agent.

Under conditions of a constant temperature of 23° C. and constant humidity of 50%, at first a fluorosilane (B) was added to the main agent. The resultant was sufficiently kneaded with a spatula for 1 minute to disperse the solid components evenly. Next, an amine based compound (C) was mixed therewith, and further the mixture was kneaded for 2 minutes. Thereafter, air bubbles in the blend were sufficiently removed, and the surface was adjusted into a flat and smooth form. This time was defined as the curing starting time, and the curing time was measured. The tip of the spatula was brought into contact with the surface of the blend at intervals of one minute. The time until the composition came not to adhere onto the spatula was defined as a skin formation time. The results are shown Table 3.

TABLE 3

| Component (part(s) by weight) | | Example 7 | Comparative Example 9 |
|---|---|---|---|
| Polymer (A) | A-4 | 100 | 100 |
| Filler | HAKUENKA CCR[1] | 50 | 50 |
| | WHITON SB[2] | 50 | 50 |
| Thixotropic agent | DISPALON #6500[3] | 2 | 2 |
| Fluorosilane (B) | fluorodimethylvinylsilane | 0.5 | |
| Amine based compound (C) | DBU | 2 | 2 |
| Curability | Skin formation time | <1 | 30 |

[1]Colloidal calcium carbonate, manufactured by Shiraishi Kogyo Kaisha, Ltd.
[2]Ground calcium carbonate, manufactured by Shiraishi calcium Kaisha, Ltd.
[3]Aliphatic amide wax, manufactured by Kusumoto Chemicals Ltd.

As shown in Table 3, when a fluorosilane (B) and an amine based compound (C) were used in combination, the curability was remarkably improved.

Synthesis Example 5

Polyoxypropylene diol having a molecular weight of about 2,000 was used as an initiator to polymerize propylene oxide in the presence of a zinc hexacyanocobaltate glyme complex catalyst to yield polypropylene oxide having hydroxyl groups at its terminals and having a number-average molecular weight of about 14,500. Subsequently, to this hydroxyl-group-terminated polypropylene oxide was added a solution of NaOMe in methanol in an equivalent 1.2 times that of the hydroxyl groups of the hydroxyl-group-terminated polypropylene oxide, and then methanol was distilled off. Furthermore, thereto was added allyl chloride to convert the hydroxyl groups at the terminals to allyl groups. Unreacted allyl chloride was removed by degassing under reduced pressure. Into 100 parts by weight of the resultant crude ally-group-terminated polypropylene oxide were incorporated 300 parts by weight of n-hexane, and 300 parts by weight of water, and then the resultant solution was stirred. Water was removed therefrom by centrifugal separation. Into the resultant solution in hexane were further incorporated 300 parts by weight of water, and the solution was stirred. Water was again removed therefrom by centrifugal separation, and then hexane was removed therefrom by degassing under reduced pressure. According to the above, allyl-group-terminated bifunctional polypropylene oxide (P-3) having a number-average molecular weight of about 14,500 was obtained.

To 100 parts by weight of the resultant allyl-group-terminated polypropylene oxide (P-3) were added 1.8 parts by weight of dimethoxymethylsilane to cause the reaction, using a solution of a platinum vinylsiloxane complex in isopropyl alcohol containing 3% by weight of platinum, as a catalyst, in an amount of 150 ppm at 90° C. for 2 hours, so as to yield dimethoxymethylsilyl-group-terminated polyoxypropylene based polymer (A-5). According to a measurement thereof by $^1$H-NMR, the number of the dimethoxymethylsilyl groups at the terminals was about 1.6, on average, per molecule.

Synthesis Example 6

In a nitrogen atmosphere, 1.4 g of a $BF_3$ diethyl ether complex (manufactured by Wako Pure Chemical Industries, Ltd.) was added dropwise slowly to 2.3 g of 3-methacryloxypropyldimethoxymethylsilane (LS-3375, manufactured by Shin-Etsu Chemical Co., Ltd.) at room temperature. The resultant was stirred at room temperature for 2 hours, and then an excess of the $BF_3$ ether complex and a reaction byproduct were removed by vacuum degassing. The resultant was distilled under reduced pressure to yield 3-methacryloxypropyldifluoromethylsilane (B-1). $^1$H-NMR spectrum of the (B-1) ($CDCl_3$): 0.36 ppm (3H), 0.85 ppm (2H), 1.82 ppm (2H), 1.95 ppm (3H), 4.14 ppm (2H), 5.57 ppm (1H), and 6.11 ppm (1H)

Synthesis Example 7

In a nitrogen atmosphere, 2.1 g of a $BF_3$ diethyl ether complex was added dropwise slowly to 2.5 g of 3-methacryloxypropyltrimethoxylsilane (LS-3380, manufactured by Shin-Etsu Chemical Co., Ltd.) at room temperature. The resultant was stirred at room temperature for 3 hours, and then an excess of the $BF_3$ ether complex and a reaction byproduct were removed by vacuum degassing. The resultant was distilled under reduced pressure to yield 3-methacryloxypropyltrifluorosilane (B-2). $^1$H-NMR spectrum of the (B-2) ($CDCl_3$): 1.09 ppm (2H), 1.94 ppm (5H), 4.17 ppm (2H), 5.60 ppm (1H), and 6.12 ppm (1H)

Synthesis Example 8

In a nitrogen atmosphere, 1.4 g of a $BF_3$ diethyl ether complex was added dropwise slowly to 3.4 g of octadecylmethoxydimethylsilane (SiO 6618.0, manufactured by Gelest, Inc.) at room temperature. The resultant was stirred at room temperature for 1 hour, and then an excess of the $BF_3$ ether complex and a reaction byproduct were removed by vacuum degassing. The resultant was filtrated to yield octadecylfluorodimethylsilane (B-3). $^1$H-NMR spectrum of the (B-3) ($CDCl_3$): 0.21 ppm (6H), 0.65 ppm (2H), 0.88 ppm (3H), and 1.26 ppm (32H)

Synthesis Example 9

In a nitrogen atmosphere, 1.4 g of a $BF_3$ diethyl ether complex was added dropwise slowly to 2.4 g of diphenyldimethoxylsilane (AY43-047, manufactured by Dow Corning Toray Co., Ltd.) at room temperature. The resultant was stirred at room temperature for 12 hours, and then an excess of the $BF_3$ ether complex and a reaction byproduct were removed by vacuum degassing, so as to yield diphenyldifluorosilane (B-4). $^1$H-NMR spectrum of the (B-4) ($CDCl_3$): 7.47 ppm (4H), 7.58 ppm (2H), and 7.73 ppm (4H)

Synthesis Example 10

In a nitrogen atmosphere, 1.4 g of a $BF_3$ diethyl ether complex was added dropwise slowly to 2.3 g of benzylethoxydimethylsilane (LS3950, manufactured by Shin-Etsu Chemical Co., Ltd.) at room temperature. The resultant was stirred at room temperature for 1 hour, and then an excess of the $BF_3$ ether complex and a reaction byproduct were removed by vacuum degassing. The resultant was distilled under reduced pressure, so as to yield benzylfluorodimethylsilane (B-5). $^1$H-NMR spectrum of the (B-5) ($CDCl_3$): 0.22 ppm (6H), 2.26 ppm (2H), 7.07 ppm (2H), 7.13 ppm (1H), and 7.25 ppm (2H)

Examples 8 to 12, and Comparative Examples 10 to 12

To the polymer (A-5) weighed into a mini-cup was first added a fluorosilane (B) in accordance with each of formulations in Table 4, and the components were quickly kneaded with a spatula for 1 minute. Next, an amine based compound (C) was added thereto, and further the components were kneaded for 1 minute. After kneading, the cup was allowed to stand still in a thermostat of 23° C. temperature and 50% humidity. In a similar manner as described above, the curing time was measured. The results are shown Table 4.

TABLE 4

| Composition | | Example | | | | |
|---|---|---|---|---|---|---|
| (part(s) by weight) | | 8 | 9 | 10 | 11 | 12 |
| Polymer (A) | A-5 | 100 | 100 | 100 | 100 | 100 |
| Fluorosilane (B) | B-1 | 0.5 | | | | |
| | B-2 | | 0.5 | | | |
| | B-3 | | | 1 | | |
| | B-4 | | | | 1 | |
| | B-5 | | | | | 1 |
| Alkoxysilane | AY43-047 | | | | | |
| Amine based compound (C) | DBU | 0.3 | 0.3 | 2 | 2 | 2 |
| Curability | Skin formation time | 1 minute | <1 minute | 20 minutes | <1 minute | <1 minute |

| Composition | | Comparative Example | | |
|---|---|---|---|---|
| (part(s) by weight) | | 10 | 11 | 12 |
| Polymer (A) | A-5 | 100 | 100 | 100 |
| Fluorosilane (B) | B-1 | | 1 | |
| | B-2 | | | |
| | B-3 | | | |
| | B-4 | | | |
| | B-5 | | | |
| Alkoxysilane | AY43-047 | | | 1 |
| Amine based compound (C) | DBU | 2 | | 2 |
| Curability | Skin formation time | >24 hours | >24 hours | >24 hours |

As in the Examples, an excellent curability was obtained in combination of various synthesized fluorosilanes (B) and an amine based compound (C). On the other hand, a sufficient curability was not obtained by use of only an amine based compound (C) as in Comparative Example 10 or by use of only fluorosilane (B) as in Comparative Example 11, and further a rapid curability was not exhibited, even when using diphenyldimethoxysilane, which was a raw material of the fluorosilane (B-4).

The invention claimed is:

1. A curable composition, comprising:
   (A) a polymer having a silicon group which can be crosslinked through formation of a siloxane bond,
   (B) fluorosilanes represented by general formula (1):

$$R^1{}_{4-a}SiF_a \tag{1}$$

wherein $R^1$'s, the number of which is 4-a, are each independently a substituted or unsubstituted hydrocarbon group having 1 to 20 carbon atoms, or at least one selected from the group consisting of siloxy groups represented by $R^2{}_3SiO-$, wherein $R^2$'s are each independently a substituted or unsubstituted hydrocarbon group having 1 to 20 carbon atoms or a fluorine atom, and a is any of 1, 2 or 3, and
   (C) an amine based compound selected from the group consisting of aliphatic amines, aromatic amines, heterocyclic amines, guanidines and biguanides,
   wherein the component (A) is a polymer having a number-average molecular weight of 3,000 to 100,000, and has one or more silicon group(s) represented by general formula (2):

$$-(SiR^4{}_{2-c}Z_cO)_1-SiR^3{}_{3-b}Z_b \tag{2}$$

wherein $R^3$ and $R^4$ are each independently a hydrocarbon group having 1 to 20 carbon atoms, or at least one selected from the group consisting of triorganosiloxy groups represented by $R^5{}_3SiO-$, wherein $R^5$'s are each independently a hydrocarbon group having 1 to 20 carbon atoms; Z is an alkoxy group b is any of 0, 1, 2 or 3 and c is any of 0, 1 or 2, provided that a case where b and c are each 0 is excluded, and 1 is an integer of 0, or 1 to 19 on average per molecule of the component (A)
   an amount of component (B) is 0.001 to 10 parts by weight of component (A), and an amount of component (C) is 0.1 to 20 parts by weight of component (A).

2. The curable composition according to claim 1, wherein a main chain skeleton of the polymer of the component (A) is at least one selected from the group consisting of a polyoxyalkylene based polymer, a saturated hydrocarbon based polymer, and a (meth)acrylic acid ester based polymer.

3. The curable composition according to claim 1, wherein the alkoxy group is a methoxy group.

4. The curable composition according to claim 1, wherein the component (B) is fluorosilanes having a molecular weight of 3,000 or less.

5. A sealing material comprising a curable composition according to claim 1.

6. An adhesive agent comprising a curable composition according to claim 1.

* * * * *